May 11, 1943.     H. W. HOFFMAN     2,318,856
INSPECTING DEVICE
Filed March 1, 1941     13 Sheets-Sheet 1

INVENTOR
HARRY W. HOFFMAN
By Paul, Paul & Moore
ATTORNEYS

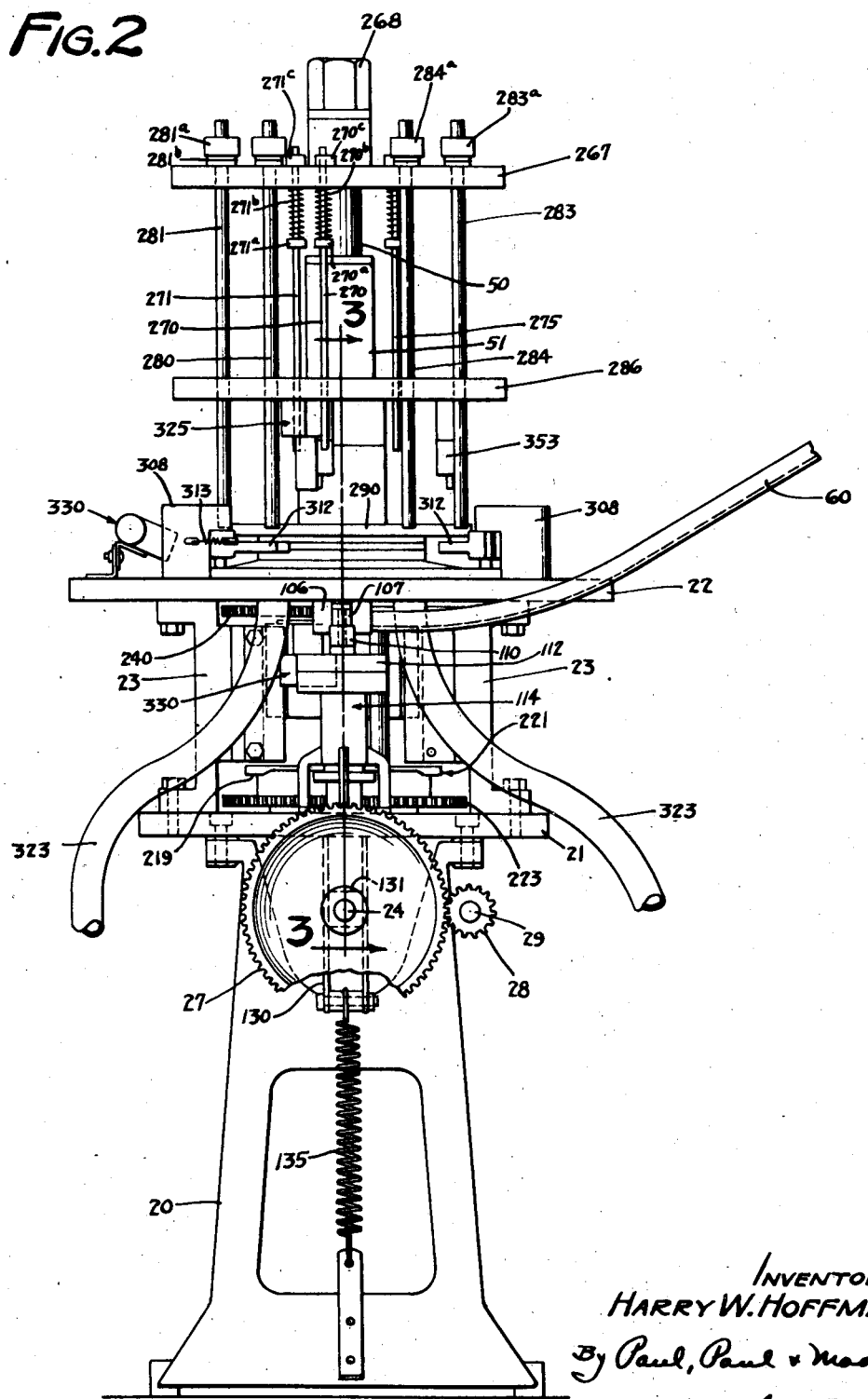

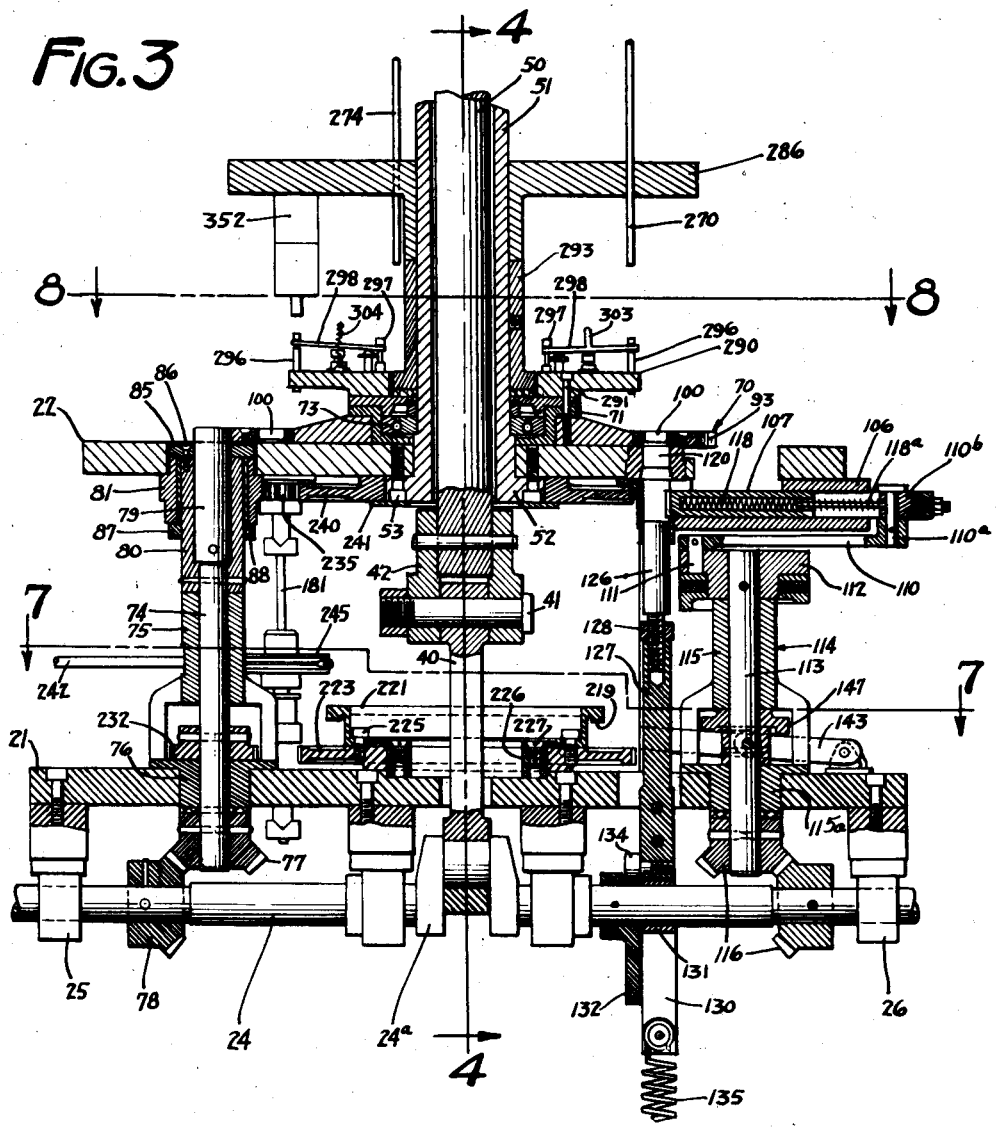

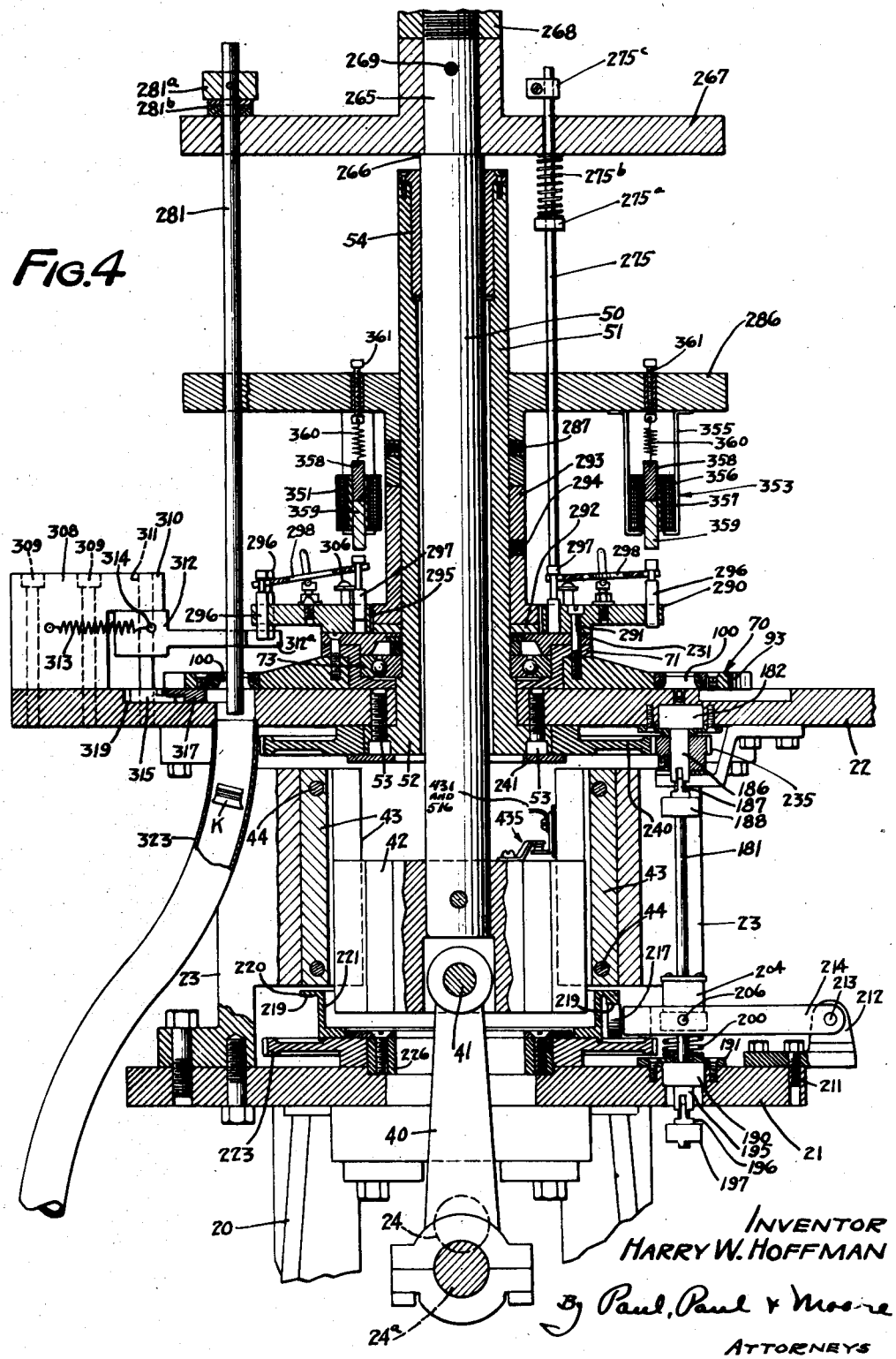

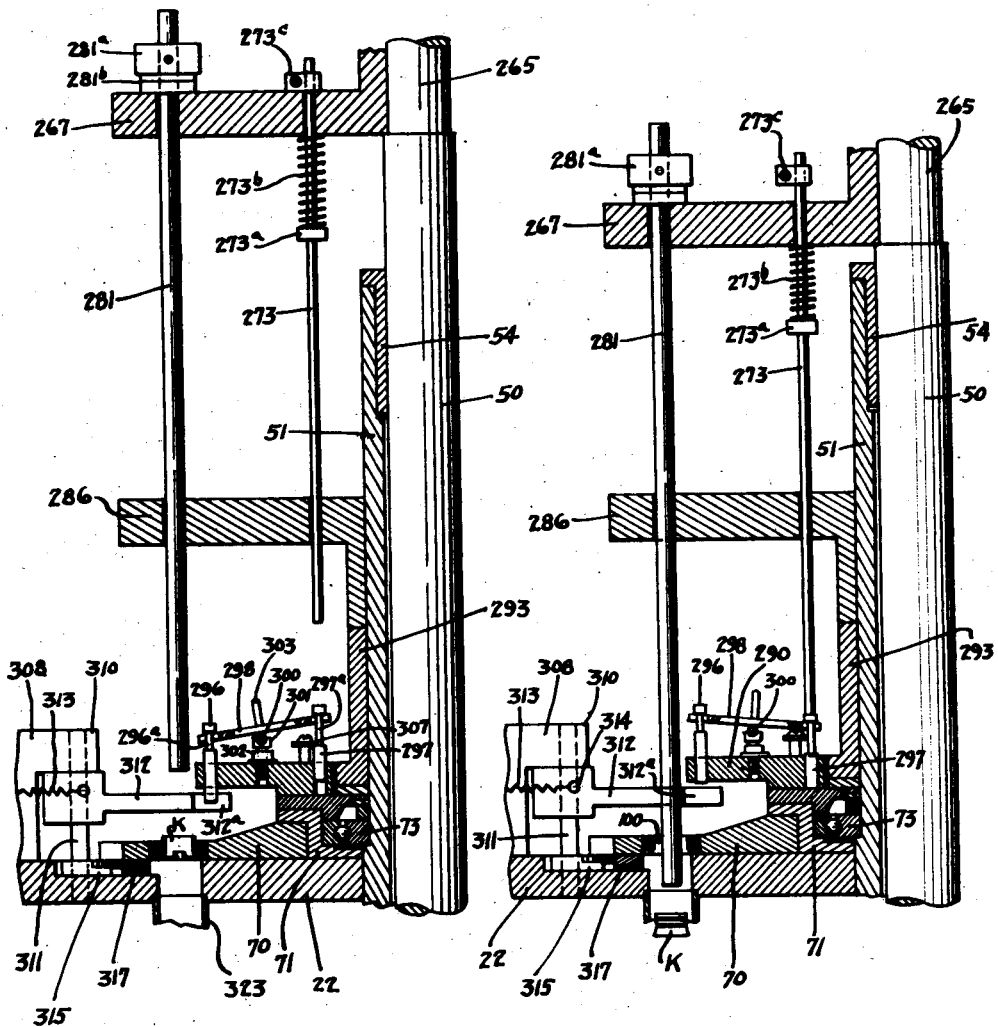

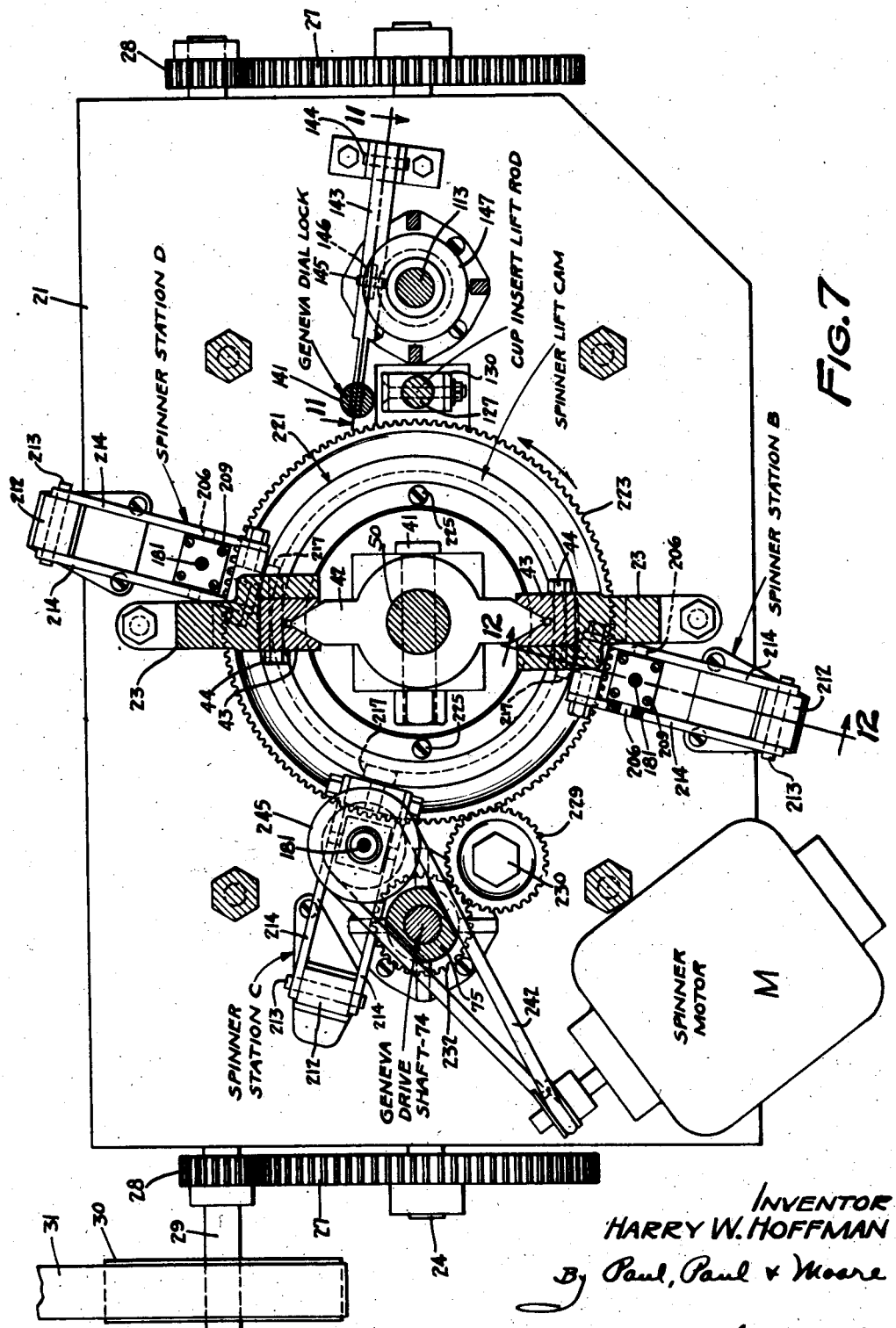

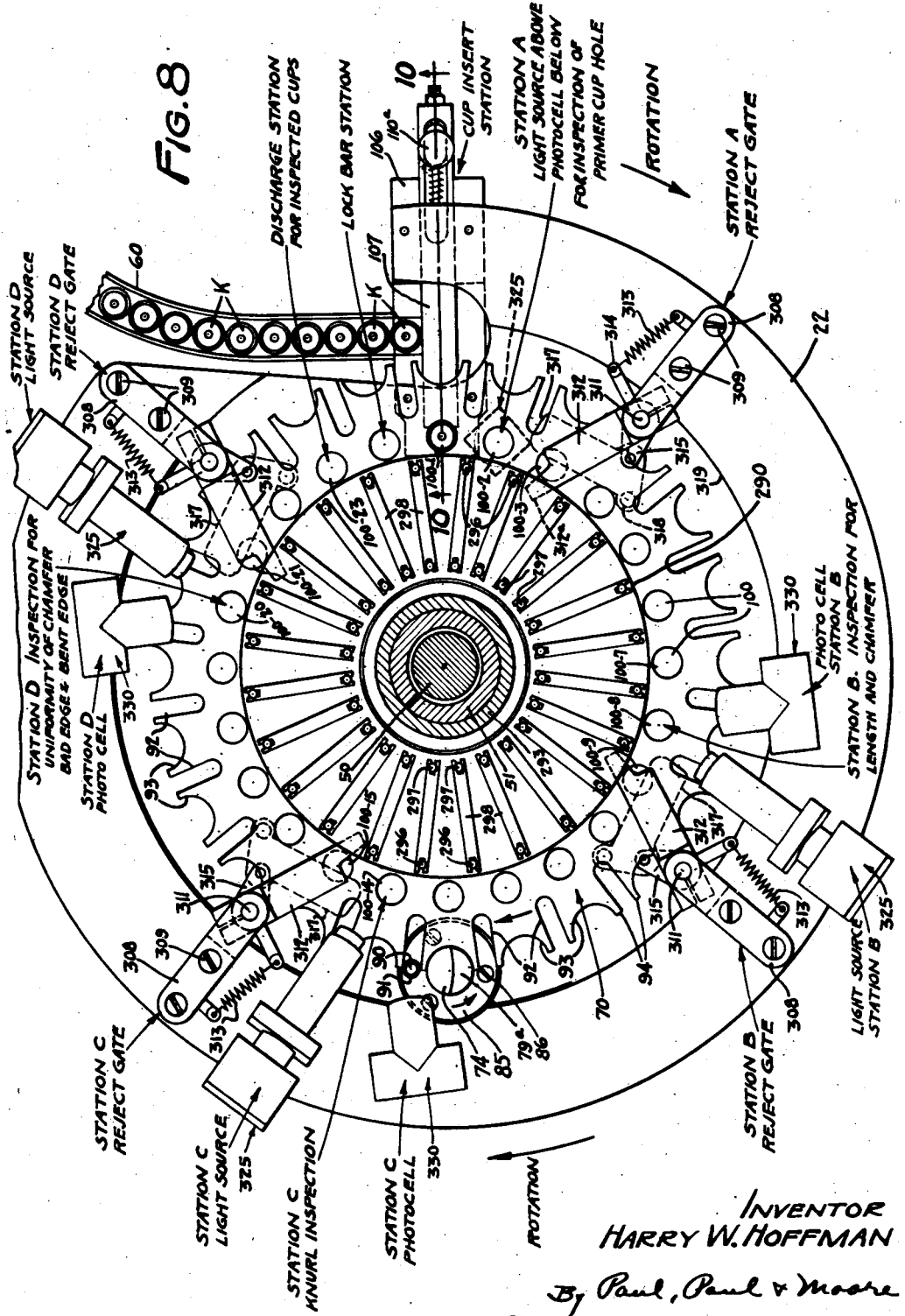

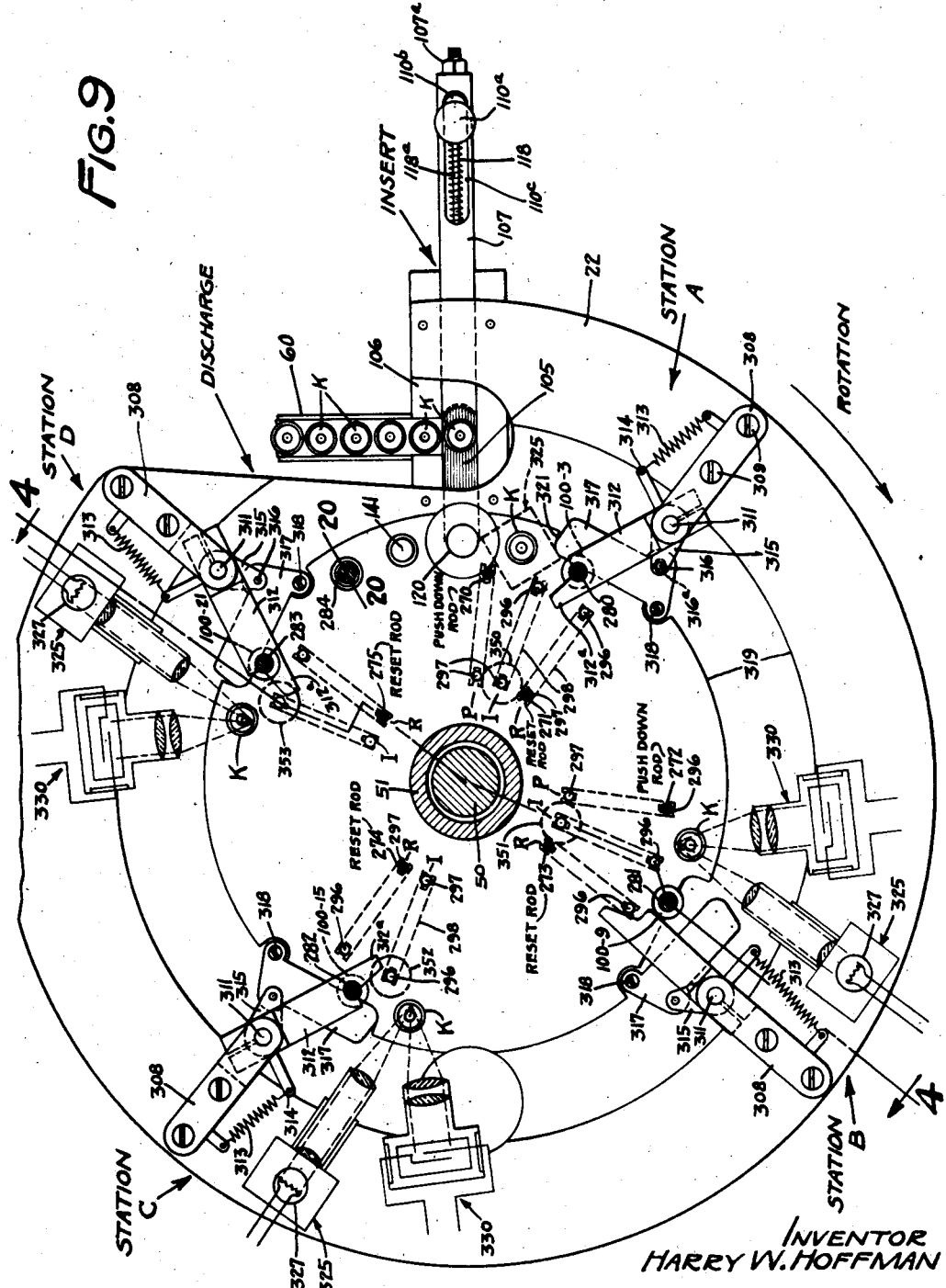

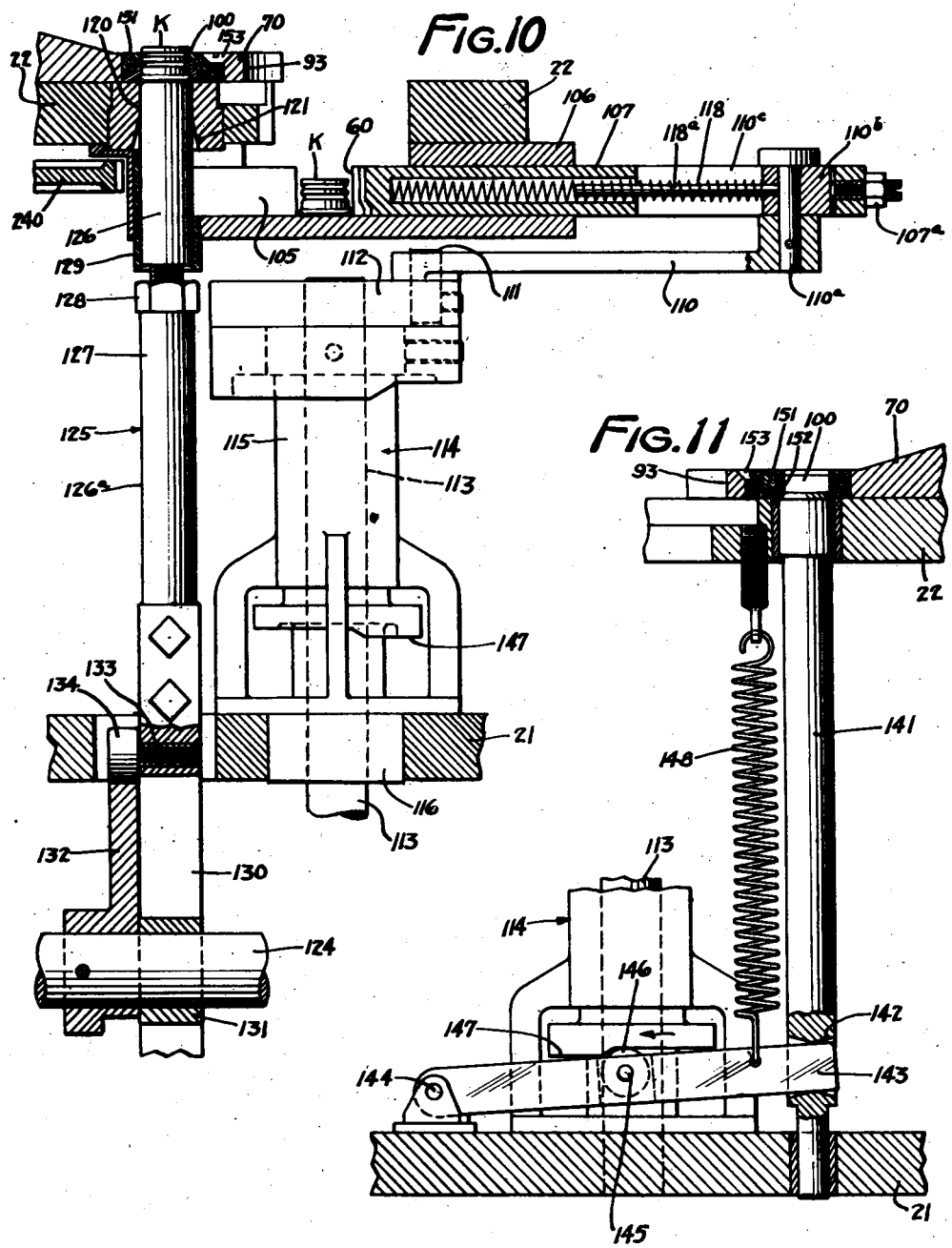

May 11, 1943.  H. W. HOFFMAN  2,318,856
INSPECTING DEVICE
Filed March 1, 1941  13 Sheets-Sheet 10

INVENTOR
HARRY W. HOFFMAN
By Paul, Paul & Moore
ATTORNEYS

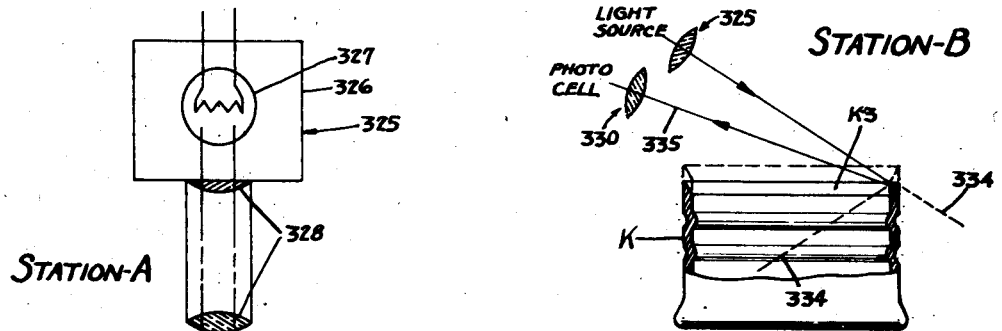
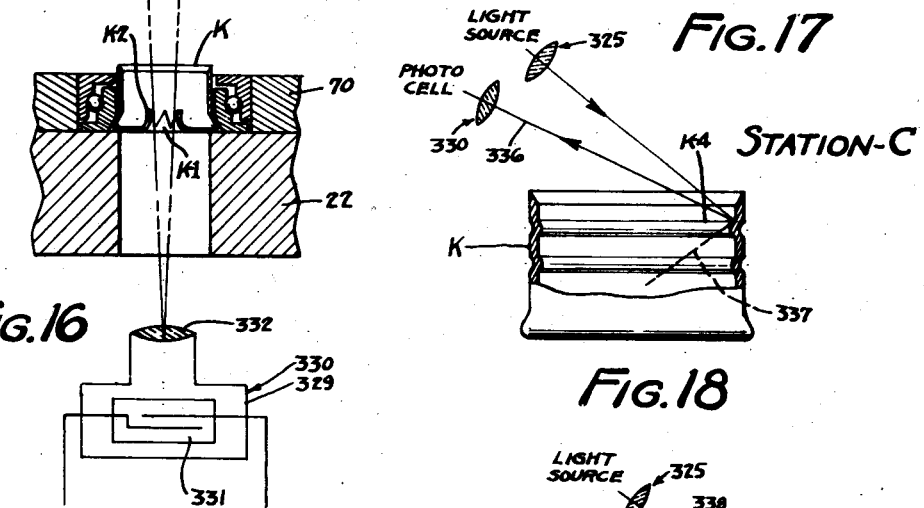
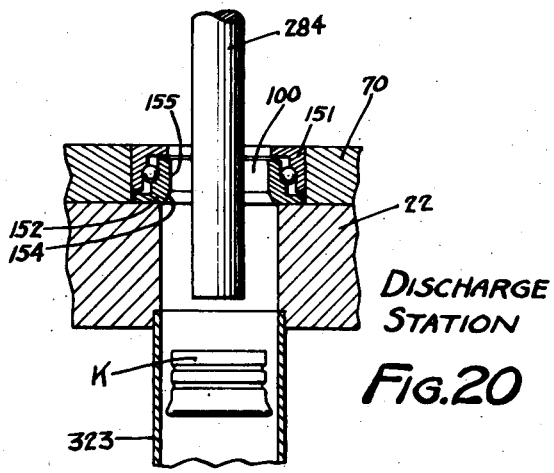

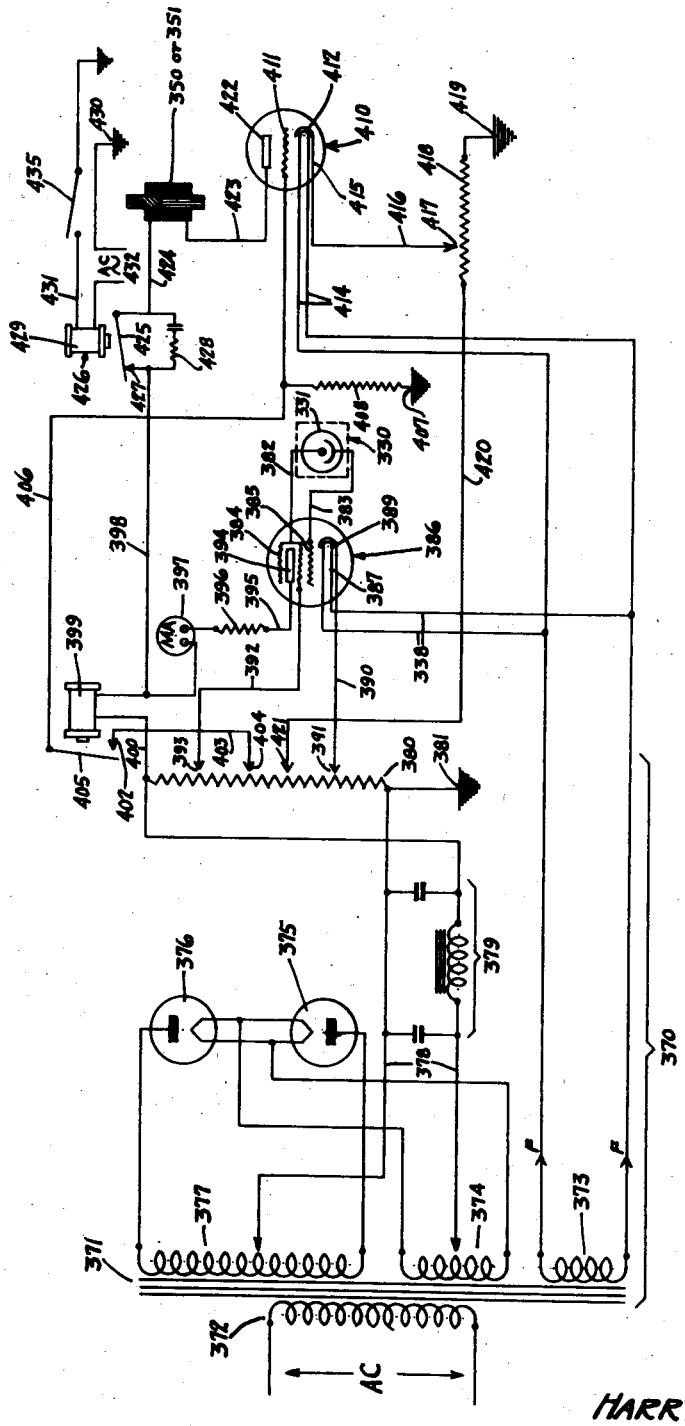

May 11, 1943.   H. W. HOFFMAN   2,318,856
INSPECTING DEVICE
Filed March 1, 1941   13 Sheets-Sheet 13
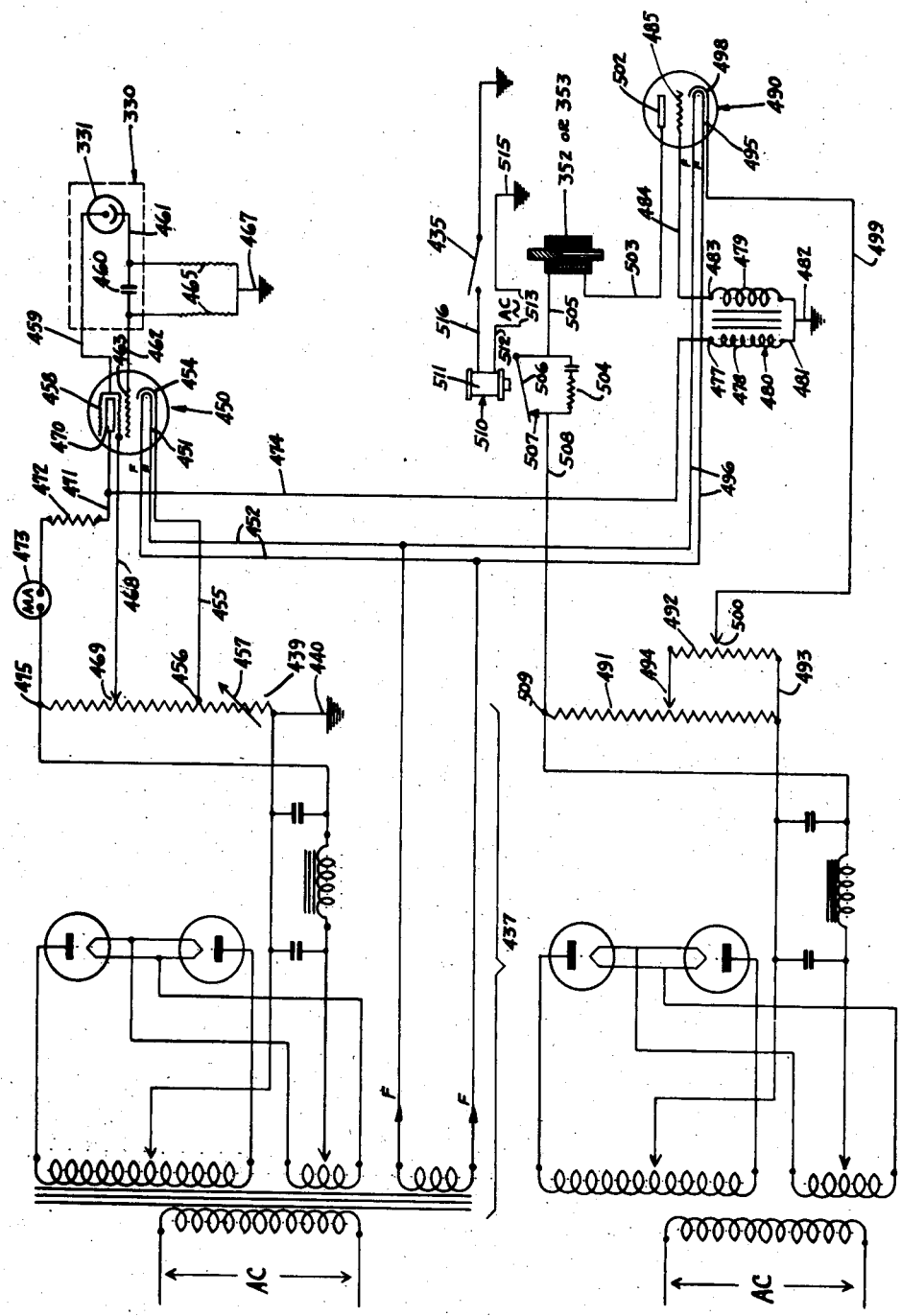
INVENTOR
HARRY W. HOFFMAN
By Paul, Paul & Moore
ATTORNEYS Patented May 11, 1943

2,318,856

UNITED STATES PATENT OFFICE 2,318,856

INSPECTING DEVICE

Harry William Hoffman, Anoka, Minn., assignor to Federal Cartridge Corporation, Minneapolis, Minn., a corporation of Minnesota Application March 1, 1941, Serial No. 381,406

16 Claims. (Cl. 209—82)

This invention relates to a method of and machine for automatically inspecting machined made parts, such as cylindrical or spherical parts, an example of which is the metal cup of a shot gun shell. Heretofore inspection of such small parts has for the most part been done manually, but the degree of inspection is in many instances so fine that defective parts are often overlooked. Thus in the case of shot gun shell cups, defective ones are often overlooked and assembled with roller paper cylinders into shells. When this occurs and the defective cup, so assembled, is finally discovered, the cost of discarding the assembled defective shell is many times that of discarding the metal cup itself. Similarly in other industries inspection of individual parts is of vital importance since, after assembly into more costly units, the rejection cost is frequently increased many fold.

An object of this invention therefore is to provide an automatic inspecting mechanism which will examine small parts in one or more ways and reject any part found to be defective.

More specifically, it is an object of the invention to provide an automatic inspection mechanism having a number of inspection stations, each capable of a prescribed inspection and capable of rejecting parts which do not fulfill established conditions of excellence, and also to provide in such mechanism instrumentalities for progressively submitting the parts being tested for inspection at such stations.

Another object is the provision of a photoelectric responsive mechanism wherein a beam of light is reflected from a portion of the surface of the part undergoing examination and responsive mechanism for ejecting any part thus found to be defective.

Still another object is the provision of such means for inspection of a portion of the surface of a hollow part, as a metal cup for a shot gun shell, by means of light directed on said surface from a suitable light source and reflected into a photo-electric cell, which cell forms part of a mechanism for passing or rejecting cups depending on whether light in sufficient quantity or of sufficient steadiness is so reflected.

It is another object of the invention to provide an automatic machine for feeding and inspecting parts in one or more particulars at one or more inspection stations and to provide means for discarding defective parts.

It is also an object of the invention to provide at one or more points of inspection, means for handling the object undergoing inspection so that the inspection is made over a completed surface; to provide also means for inspecting at one position and for rejecting the part, if defective, at another position.

These and other objects, as will hereafter appear, are accomplished by this invention which is fully described in the following specification, and shown in the accompanying drawings in which Figure 1 is a front elevation of the machine;

Figure 2 is a side elevation as viewed from the right side of Figure 1;

Figure 3 is a partial enlarged vertical section on the line 3—3 of Figure 2;

Figure 4 is an enlarged vertical section generally on the line 4—4 of Figure 3. The section line also being shown at 4—4 in Figure 9. In Figure 4, certain of the part ejecting mechanisms are shown in one condition of operation.

Figure 5 is a partial vertical section similar to Figure 4 but with the parts in a condition of operation prior to that condition shown in Figure 4.

Figure 6 is similar to Figures 4 and 5, showing the parts in condition of operation subsequent to that shown in Figure 4.

Figure 7 is a plan view in section taken along the line 7—7 of Figure 3.

Figure 8 is a plan view in section taken along the line 8—8 of Figure 3.

Figure 9 is a plan view, partly schematic, partly in section, and showing one of the parts (hereinafter known as the Geneva dial) removed.

Figure 10 is an enlarged partial vertical section on the line 10—10 of Figure 8. This view shows the cup feeding mechanism.

Figure 11 is an enlarged partial vertical section on the line 11—11 of Figure 7. This view shows the dial lock mechanism, when used.

Figure 12:
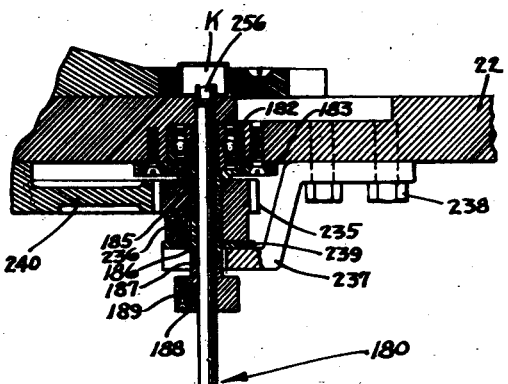

Figure 12 is an enlarged partial vertical section on the line 12—12 of Figure 7, showing the spinner mechanism raised for rotating the part undergoing inspection.

Figure 13:
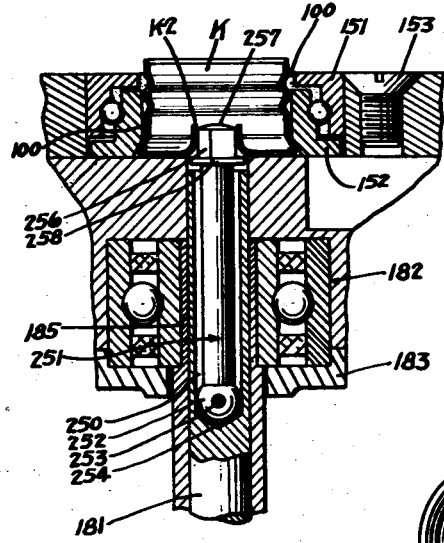

Figure 13 is similar to Figure 12 but shows an enlarged fragment in section through the top showing the spinner pin mechanism, with the mechanism in the same condition as in Figure 12.

Figure 14:
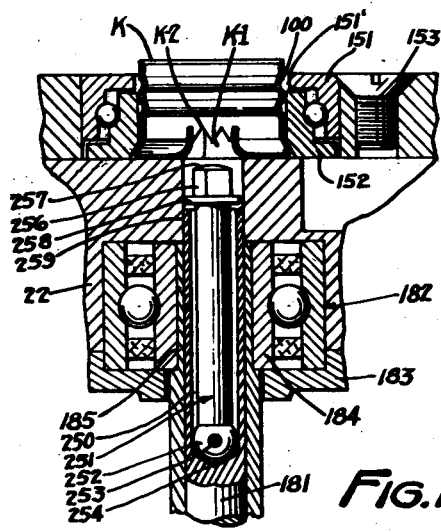

Figure 14 is similar to Figure 13 but shows spinner mechanism lowered from the part being inspected.

Figure 15:
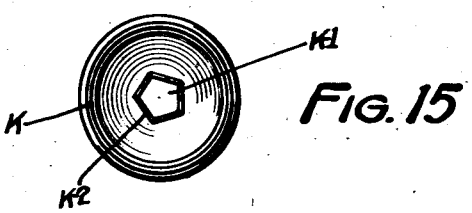

Figure 15 is a top plan view of a shot gun shell cup.

Figure 16 is an enlarged view partly schematic in section of a portion of the Geneva dial showing a shot gun shell cup in place thereon and the photo-electrical optical system at inspecting station A, wherein the cup is inspected for proper piercing of the cup for receiving the primer cap.

Figure 17 is an enlarged schematic view partly in vertical sections showing a shotgun shell cup and photo-electric cell optical inspection system at inspecting station B whereat the cup is inspected for length and for chamfer (but not uniformity of chamfer).

Figure 18 is an enlarged schematic view partly in vertical section showing a shotgun shell cup and photo-electric cell optical inspection system at inspecting station C whereat the cup is inspected for knurl and completeness (uniformity) of knurl.

Figure 19 is an enlarged schematic view partly in vertical section showing a shotgun shell cup and photo-electric cell optical inspection system at inspection station D, whereat the cup is inspected for irregularity of knurl, bad edge or bent edge.

Figure 20 is a detailed section in elevation of the discharge opening of station A, taken along the line 20—20 of Figure 9.

Figure 21 is a wiring diagram of the power and photo-electric cell circuits used in conjunction with inspection stations A and B.

Figure 22 is a wiring diagram of the power and photo-electric cell circuits used in conjunction with inspection stations C and D.

GENERAL PLAN OF INSPECTION

The illustrated embodiment of the invention is composed generally of a machine for receiving and moving the parts undergoing inspection step by step through a plurality of stations, and then discharging the part. Throughout the movement of the part in the machine it is subjected to one or more inspections, four being here illustrated. At or near each station the part there undergoing inspection is either passed or rejected according to whether it is fit or unfit.

In the illustrated embodiment the four inspecting stations are as follows:

Station A.—The part, here illustrated as a shotgun shell cup is inspected for primer cap aperture, both for the sufficiency and the existence of the aperture. At this station the part is not "rotated" and the photo-electric response is based upon sufficiency of light passed through the primer cup aperture. The photocell circuit is of the AB type shown in Figure 21.

Station B.—Inspects for "too long" or "too short" conditions of the cup sidewall and for the existence (but not regularity) of the "chamfer" at the upper inner edge of the cup sidewall. At this station the cup is rotated and if the condition of the cup edge is satisfactory at at least a portion of the cup edge it is passed. The photocell circuit is of the AB type shown in Figure 21.

Station C.—Inspects for existency and regularity of the "knurling" of the cup. At this station the cup is rotated and if the knurl is satisfactory all around it is passed. The photocell circuit is of the CD type shown in Figure 22 and is responsive to variations in light reflected from the part undergoing inspection, the part being rejected if the variations are of a predetermined amount.

Station D.—Inspects for "regularity of chamfer," and "bent edge" and "bad edge." At this station too the cup is rotated and is rejected if the chamfer is of predetermined irregularity or the upper edge of the cup is bent or irregular. The photocell circuit is of the CD type and is responsive to irregularities in light reflected from the chamfered edge of the cup undergoing inspection.

At all of the stations the inspection is done by light at one position in the station and the photocell circuits and mechanisms eject the cup, if unfit, at another position in the stations.

*The machine*

The embodiment of the inventions herein illustrated and described comprises a machine having a floor stand or base generally designated 20 upon which is bolted a subtable 21. Above this is mounted a table 22 by means of spacer members 23, the latter being secured to the table and subtable by means of capscrews or the like. Beneath the subtable 21, is a main shaft 24 journaled in suitable bearings 25 and 26 and having gears 27 carried thereon, these gears being meshed with pinions 28 on drive shaft 29, Figure 7. The drive shaft is provided with a pulley 30 (Figure 7) driven by a belt 31. The shaft 24 is the main shaft of the machine and serves to drive the various machine parts as will later appear.

Figure 1:
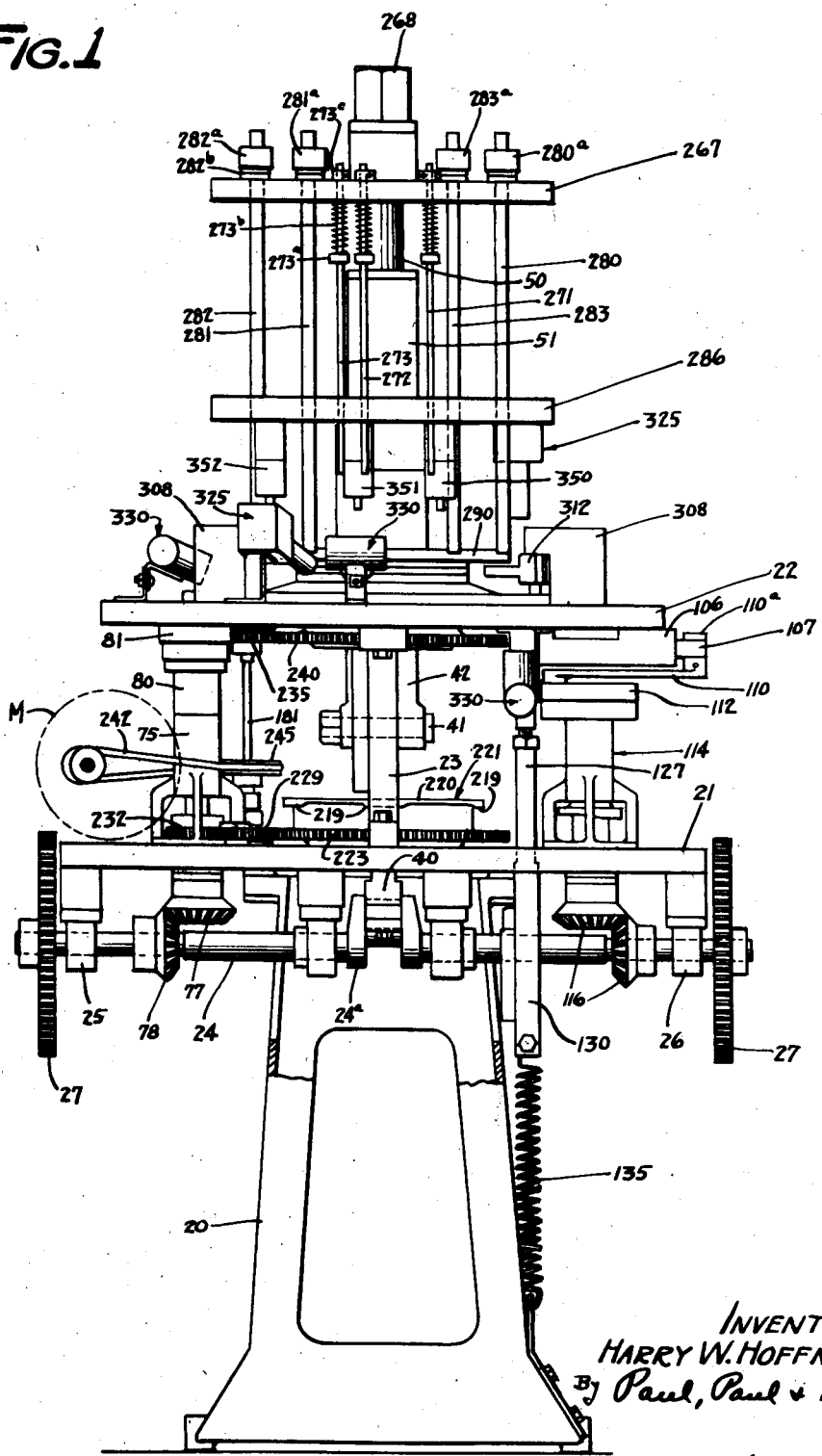

The main shaft 24 is provided with a crank 24a, Figures 1 and 3, on which is mounted a connecting rod 40, the opposite end of this connecting rod being connected to a pivot 41 on a crosshead 42. The crosshead has V-shaped vertical edges slidably mounted in guideways 43, which are in turn secured to the spacer members 23 by means of capscrews 44, as shown in Figure 7.

To the crosshead 42 there is pinned a central vertical slidable operating rod 50, which passes through a vertical sleeve 51, Figure 4. At the lower end of the sleeve there is a circular flange 52 through which passes capscrews 53 for securing it to the table 22. Within the upper end of sleeve 51 there is secured a bearing 54 through which slides the upper portion of the operating rod 50. The rod being thus guided near its upper and lower ends and joined to connecting rod 40 reciprocates as the shaft 24 rotates.

*The Geneva dial and drive.*—For carrying the parts being inspected, here illustrated as shotgun shells, through the successive testing stations there is provided a Geneva dial 70, which is mounted axially with respect to the operating rod 50 and the sleeve 51. The Geneva dial carries central, flanged, bearing retainer 71 in which ball bearing race 73 is fitted and held in place by retainer plate 231. The inner race of bearing 73 is snugly fitted on sleeve 51 and thus maintains an accurate center of rotation for the Geneva dial.

The drive for the Geneva dial consists of a vertical shaft 74, Figures 3 and 8, which is journaled in a bearing housing generally designated 75 secured to the sub-table 21. The housing 75 has a 4-legged central portion and a lower end 76 which is accurately fitted into an opening on the subtable 21. The shaft 74 is driven from the shaft 24 and at an equal speed by means of mitre gears 77 and 78 which are of equal size. At the upper end of shaft 74 and in axial alignment therewith there is a stub shaft 79, the shafts 74 and 79 both being pinned to a connecting sleeve 80 which holds them in axial alignment. The connecting sleeve is journaled in a bearing 81, secured to the underside of the table 22. On the shaft 79 and above bearing 81 there is a drive plate 85. The plate is centered on shaft 79 and is attached at the upper end of the sleeve 80 by screws 86. Below the journal 81 there is a collar 87 held in place by setscrew 88.

Referring particularly to Figure 8, it will be seen that the drive plate 85 carries a pin 90 having a roller 91 rotatably mounted thereon, the roller being adapted successively to engage the evenly spaced radial slots 92 in the Geneva dial 70. There are twenty-four slots 92 and they are accordingly 15° apart. During substantially one-half turn of the Geneva drive shaft 74—79, the drive roller is in engagement with a slot 92, and the Geneva dial is advanced one slot, or 15° of movement.

The outer edge of the Geneva dial is provided with twenty-four semi-circular indentations 93, located midway between successive slots 92, these indentations being adapted to come into registration with the half-end 79a of the shaft 79. The upper end of the stud shaft 79 is cut away, so as to permit the outer extremities 94 of the slots 92 to clear the shaft 74.

As the shaft 74 is continuously revolved the Geneva dial 70 is advanced periodically one twenty-fourth of a complete revolution or 15°, and between each advance is brought to a complete stop and is locked against rotation in the position shown in Figure 8, by the engagement of the end portion 79a of shaft 79, the part which is not cut away.

In the Geneva dial 70 there is a series of vertical openings 100, each of which is provided with a ball bearing or other anti-friction bearing, the inner race of which is adapted to receive metal cups undergoing inspection as shown in Figures 4, 8 and 9. The construction and operation of these details will later be described in greater detail.

*Cup feeding mechanisms.*—Referring to Figures 3, 8, 9 and 10, the metal cups to be inspected are fed by gravity in the downwardly extending curved chute 60 to a level just below the table 22, the chute being terminated in the cup feed passage 105 in a block 106. The block 106 is fastened to the underside of the table 22 by means of screws, not shown, and carries an injector 107 which is freely movable endwise in the passage 105. The injector 107 is reciprocated once for each rotation of shafts 24 and 79 by means of a connecting rod 110 driven by a crank pin 111 on a crank disc 112, the latter being keyed to a vertical shaft 113. The shaft 113 is journaled in a bearing housing 114 of the type shown at 75 having an upper bearing portion 115, a lower bearing portion 115a, the bearing housing 114 being secured to sub-table 21. The shafts 24 and 113 carry identical mitre gears 116 and shaft 113 is accordingly driven at the same speed as drive shaft 24.

The connecting rod 110 carries a pin 110a which serves to mount block 110b slidably endwise in slot 110c of the injector 107. The block carries a spring 118 on rod 118a which is interposed between the block 110b and the member 107. Spring 118 hence transmits the sliding force to injector 107 and is sufficiently resilient so as not to crush the metal cups K should one become jammed. A set screw and lock nut 107a are provided for accurate adjustment of the position of injector 107 with respect to the connecting rod 110, this being important for accurate positioning of the cup over lift rod 127.

The end of passage 105 terminates beneath one of the positions assumed by openings 100 in the Geneva dial as the dial is caused to pause between successive progressive movements, and this position is known as the cup insert station. Table 22, upon which the Geneva dial rests is bored out at this position and is fitted with a bushing 120 which is internally tapered as shown as 121. Provision is made for lifting the cups into the Geneva dial openings as each pauses at the cup insert station and to accomplish this there is provided a lift rod generally designated 125 composed of a tip 126 which engages the cup and a lower section 127, the two sections being accurately adjustable by threaded coupling 128. The lift rod is oscillated vertically in timed relationship to the movement of the injector 107, so as to lift into the Geneva dial openings, the cups which are moved under the dial openings by the injector 107. The lift rod is guided at the top by means of a guideway 129 and at the bottom by means of a yoke 130, which extends down on each side of square collar 131 on shaft 24. The yoke 130 carries a cam follower roller 134 mounted on screw 133, the roller being positioned to ride upon cam 132 carried by shaft 24, the entire lift rod being held down resiliently by spring 135. The follower 134 thus riding on the face of the cam 132 operates the lift rod up and down.

The lift rod 126 rises and falls once on each revolution of the shaft 24 and the slide member 107 makes one forward movement at each stroke carrying the foremost metal cup K in slide 60 to a position over the then lowered lift rod. The lift rod then rises, engages the cup and lifts it into place in opening 100 positioned to receive the cup, and holds the cup in the opening until the Geneva dial begins to advance. Figure 10 shows the lift rod in its uppermost position, in which the very top of the rod is just flush with the bottom of the cup receiving openings 100 in the Geneva dial 70.

Concerning the timing: injector 107 is timed so as to bring a cup to the lifting position over lift rod 126 and to partly retract as the Geneva dial comes to a halt. The cam 132 is shaped so that it then lifts the rod 126 and raises the cup into the dial, while the dial is halted, and to hold the lifted cup in place as the dial begins to move away from the insert station bushing 120.

To prevent damage to the mechanism should one of the metal cups be caught by the feed mechanism during the lifting of the lift rod 126, the member 126a may optionally be provided with a resilient coupling such as that shown in the drive of injector 107 so as to permit the upper end of the lift rod to yield thereby preventing damage to the Geneva dial and the bearing member in the event one of the cups becomes stuck during lifting.

*Geneva dial auxiliary lock.*—In order to insure that during the life of the machine, the Geneva dial shall stop with the openings 100 in accurate registry with the feeding and inspection stations, regardless of wear in the Geneva drive mechanism, there may optionally be provided a mechanism shown in Figure 11. This consists of a lock rod 141 guided for vertical sliding movement in bushing fitted openings in table 22 and sub-table 21. The rod and openings are positioned so as to engage openings 100 when in a position immediately preceding the opening 100 in registry with the feeding station. In order to lift the lock rod periodically at each pause of the Geneva dial, the rod is provided at the lower end with a through slot 142 and into the slot there extends the free tip of operating lever 143. The lever 143 is pivotally mounted at 144 and carries a pin 145 upon which is rotatably mounted a cam follower roller 146, the latter being adapted to engage the lower face of a cam 147 keyed on the shaft 113 of the cup feed mechanisms previously described. The lever 143 is normally lifted by a tension spring 148 which serves to hold the roller 146 on the face of the cam 147 and yieldably to lift the pin 141 so that its upper tapered end is in engagement with the tapered lower portion of an opening 100 which is at that instant in registration with the locking pin. Thus, the Geneva dial may be positively locked by locking pin 141, in addition to the locking function inherently provided in the Geneva movement by virtue of the engagement of the upper end 79a of the shaft 79 with the semi-circular openings 93. The elements of the Geneva movement are subject to greater wear than that imposed on the locking rod 141 and consequently in service, tend to lose the requisite accuracy. Therefore the locking rod improves the accuracy of the machine throughout periods of long service.

*Rotatable cup supports in the Geneva dial.*—Referring now to Figures 8, 9, 12, 13 and 14 particularly; as previously explained the inspection sequence includes a number of stations, at some of which provision is made for rotating the cups K undergoing inspection. To facilitate rotations of the cups K, the openings 100 in the Geneva dial 70 are each provided with anti-friction bearings, preferably a ball bearing assembly, although a simple bronze bearing of the self lubricating type may also be used. In Figures 12, 13, 14, 16 and 20, the openings 100 are fitted with a ball bearing assembly having an outer race 151 and an inner race 152. The outer race is fitted into the Geneva dial 70 and is locked in place with screws 153. The inner race 152 has cylindrical axial opening 155 counter-sunk at 154 to accommodate the rim K' of the metal cup parts undergoing inspection as shown. Plain bearings for this service are illustrated in Figures 3, 5 and 6.

The 155 inner wall of inner race 152 (of either the plain or ball bearing type) is of a diameter such as to provide a snug, but not a tight fit for the cups K. The outer race 151 is cut back at 151' so as to provide clearance between it and the cups K. In this way, the cups K are mounted for easy rotation in the Geneva dial as required for certain of the inspection stations.

*Cup spinner mechanism.*—The cup spinner mechanisms, provided at inspection stations B, C and D are identical and the description of one will therefore suffice for all. They are illustrated in Figures 1, 4, 7, 12, 13 and 14, particularly Figure 12. The spinner mechanism is generally designated 180 and includes a shaft 181 which is journaled for rotation and for vertical oscillation. The upper journal consists of a sealed self lubricating ball bearing assembly 182 which is held in place by retainer plate 183. Into the inner race 184 of the bearing, there is pressed a sleeve 185, through which the shaft 181 is fitted so that it slides neatly. The lower end 186 of sleeve 185 is splined and receives a similarly splined portion 187 of collar 188, the collar being fastened to shaft 181 by a set screw 189.

The lower bearing supporting shaft 181 is similar to the upper bearing and includes a lubricated and dirt sealed ball bearing race 190 held in place in an aperture in sub-table 21 by retaining plate 191. Into the inner race 194 of the bearing, there is pressed a sleeve 193 which is splined at the lower end 195 so as to fit a correspondingly splined portion 196 of collar 197. The collar 197 is fastened to spinner shaft 181 by setscrew 198.

Since spinner shaft 181 is slidably fitted in both sleeves 186 and 195, the shaft is free to move vertically while rotating in the bearings 182 and 190.

The shaft is constantly pressed upwardly by a spring 200 resting upon plate 191, the upper end of the spring 200 being abutted against a cup 201 which receives a ball thrust bearing 203. The upper race of the ball thrust bearing bears against a collar 204 tightly fastened to shaft 181 by set screw 205. Hence spring 200 normally lifts the spinner shaft 181 to its highest position.

At each spinner station, there is provided a bracket, generally designated 210, fastened to sub-table 21 by cap screws 211. The bracket has an upstanding post 212 carrying a through pin 213 which serves as a support for the retraction lever 214, the latter being bifurcated as shown in Figure 7. The bearing retaining cup 201, previously referred to, is provided at each side with trunnions 206 which are journaled in the bifurcated arms of the retraction lever 214, as shown in Figure 7. Above collar 204 on spinner shaft 181, there is a down thrust ball bearing 207 retained in cup 208, the cup in turn being fastened to the lower cup 201 and hence to the retraction arm 214 by through cap screws 209.

Into the free end 215 of the retraction lever, there is threaded a pivot screw 216 which carries a cam roller 217, the latter being adapted to bear against the cam surface 219 of flange 220, on the circular cam 221, best seen in Figure 3. The cam 221 is mounted coaxially upon constantly rotating gear 223 to which it is fastened by cap screws 225. Gear 223 in turn is journaled on and held in place on sub-table 21 by flanged retaining collar 226 which is attached to sub-table 21 by cap screws 227.

The drive for gear 223 is shown in Figure 7 and is through idler gear 229, journaled upon the hexheaded cap screw 230, and through gear 229 to constantly rotating gear 232 on the Geneva drive shaft 74.

Referring again to Figure 12, the sleeve 185 extending downwardly from inner race 184 serves as a mounting for gear 235 which is fastened to the sleeve by set screw 236. The gear 235 is additionally supported by bracket 237, fastened to table 22 by cap screws 238. An anti-friction washer 239 is provided between the gear 235 and bracket 237.

Gear 235 of each spinner meshes with master spinner gear 240, the latter being journaled upon the lower flange 52 of the vertical guide 51, and held in place by retaining plate 241 as shown in Figures 3 and 4. Hence all of the spinner shafts are geared together.

Power for driving all of the spinners is transmitted from spinner motor M, Figure 7, through belt 242 to a pulley 245 on one of the spinner shafts, and through its gear 235 drives the master spinner gear 240 and through it drives the other spinners.

Referring again to Figures 12, 13 and 14, the upper end of the spinner shaft 181 is drilled axially at 250 to receive the cup engager, generally designated 251. The cup engager has a lower ball end 252 which has a close, but free, fit in the drilled opening 250. The ball joint rests against the conical bottom 254 of the opening 250 and is free to move slightly. A pin 253 passes through the spinner shaft 181 and ball end 252, the pin being loosely fitted in either one or the other so as not to restrict free movement of the cup engager 251. The upper end of the cup engager has a pentagonal head 256 to fit, in this case the pentagonal primer cup openings K—1 of the shot gun shell cups, the head 256 being smoothed off at 257 and provided with a flange 258 which defines the limits of sidewise movement within the bore 259 of table 22.

The cam 221 is provided with four lobes 219, three of which are shown in Figure 1. The size of gears 232, 229 and 223 are such that as gear 232 makes one turn, gear 223 (and hence cam 221) will make one-fourth turn. The three inspecting stations utilizing the spinner mechanism, namely stations B, C and D, are situated 90° apart on the Geneva dial (or 6 Geneva dial spaces). Hence, as the Geneva dial 70 is advanced one space (1/24 revolution) by one turn of the Geneva drive shaft 74—79, gear 223 and cam 221 are moved one-fourth revolution. The cam lobes 219 are oriented with respect to the gear spinner stations, and the cams are of such a length, that as the Geneva dial 70 stops, with the cups therein at the various inspection stations, the spinners are lifted so as to cause the cups to spin and the spinners are then retracted. All this occurs while the Geneva dial pauses.

*Ejecting mechanism.*—Referring to Figures 2 and 4, the upper end of the operating rod 50 is turned down as shown at 265 so as to leave a shoulder 266 upon which rests a circular operating head 267. The operating head 267 is held onto the rod 50 and against the shoulder by means of a hexagonal nut 268, and the head is prevented from rotating on the rod by the through pin 269. Thus, as the main operating shaft 24 rotates, and for each turn moves the Geneva dial 70 one space (1/24 revolution), it also moves the operating rod 50 and the operating head 267 up and down, once for each step of the Geneva dial, the Geneva dial being stationary during the down part of the stroke from the time that the head is part way down and until it is partly retracted on the upstroke.

The operating head carries a plurality of push down and reset rods 270, 271, 272, 273, 274 and 275, and a plurality of reject rods 280, 281, 282 and 283, and a discharge rod 284, these rods being located in the operating head 267 according to the plan shown in Figure 9. The rods are vertical and the mid part of each slides in an appropriately spaced hole in a guide plate 286, which is fastened to the sleeve 51 by means of set screws 287. The push down and reset rods are each provided with a collar, as that shown upon rod 270, the collar being designated 270a. Between the collar and the operating head 267, there is provided a spring 270b, which maintains a uniform downward pressure upon the setting pin. The downward movement of each rod is limited by an adjustable clamp, such as that shown at 270c. The reject rods and discharge rod are provided at their upper ends with weighting collars such as that shown at 281a on the rod 281. Between the collar and the operating head 267, there are interposed one or more buffer washers 281b of felt, leather or the like, which serves to cushion the contact of the rods when they are lifted by the operating head. Hence, for each rotation of the main operating shaft 24, there is an up and down movement of the vertical operating rod 50, the operating head 267, and all of the set, re-set, rejecting and discharge rods, the movement of the latter being vertically, guided by the guide plate 286.

Referring particularly to Figures 3 and 4 upon the top of the bearing retaining plate 231, there rests a gate operating disc 290, which is attached to the Geneva dial 70 by means of the through cap screws 291 as shown in Figure 4. Hence, the Geneva dial, the bearing retaining cup 71, the bearing retainer 231, and the gate operating disc 290 are all fastened together and rotate as a unit. Above the bearing retaining plate, there is positioned an anti-friction washer 292, which is free to rotate, and bearing upon the washer is the spacing sleeve 293, which is attached to the stationary sleeve 51 by means of set screws 294. Clearance is provided at 295 between the flange of the spacing sleeve 293 and the center circle opening of the gate operating disc 290 so as to provide for free rotation.

Referring to Figures 3, 4, 5, 6 and 8, it will be observed that the gate operating disc 290 has a plurality of gate operating pins 296, and reset pins 297, there being 24 gate operating pins and 24 reset pins, one of each for each cup carrying aperture 100 in the Geneva dial 70. The vertical apertures in the gate operating disc 290, receive the gate operating pins 296 and the reset pins 297 and are so spaced that the gate operating pins 296 and reset pins 297 are on a radial line midway between successive cup carrying apertures 100 in the Geneva dial.

The gate operating pins 296 are cut away at 296a and the reset pins are similarly cut away at 297a to receive a rocker arm 298, which is pivoted at 300 on the head of a vertically adjustable screw 301, the screw being fitted with a lock nut 302. The rocker arm 298 has an upstanding arm 303 to which a biasing spring 304 is attached as shown in Figure 3. Adjacent each of the reset pins, there is a suitable screw 306, provided with a large washer 307 at its head which, abutting against the lower shoulder of the cut-away part 297a of the pin 297, serves to limit the upward movement of the reset pin 297.

It will thus be seen that the gate operating pin and reset pin are connected together for correlated movement. Thus, when the reset pin 297 is pushed downwardly, it pulls down on the rocker arm 298 until the upstanding arm 303 is over-center at which time the energy of the spring 304 will serve to snap the rocker arm 298 to the down reset position thereby simultaneously lifting the gate operating pin 296a. Likewise, when the gate operating pin is pushed down, it will, through the operating arm 298, effect an upward movement of the reset pin 297, the over-center arrangement of spring 304 and arm 303 again being effective to maintain the established position.

There is one gate operating pin 296, one reset pin 297, and the accompanying rocker arm 298, etc., for each of the cup receiving apertures 100 in the Geneva dial, the reset pin, etc., for each cup being positioned 7½° in advance of the cup 100 to which it appertains.

Referring to Figures 8 and 9, it will be seen that the cups are inserted into the Geneva dial 70 at the "cup insert station" and the cups, thus successively loaded into the dial, begun their journey around through approximately one complete turn of the dial. The rotation is clockwise as viewed in Figures 8 and 9.

Considering the dial holes, as equivalent to the positions one hole successively assumes, the various stations and positions are as follows:

| | | |
|---|---|---|
| 100—1 | Cup insert station (also preparation for station A) | |
| 100—2 | Inspect position | station A |
| 100—3 | Reject and reset position | station A |
| 100—7 | Preparation for | station B |
| 100—8 | Inspect position | station B |
| 100—9 | Reject and reset position | station B |
| 100—14 | Inspect position | station C |
| 100—15 | Reject and reset position | station C |
| 100—20 | Inspect position | station D |
| 100—21 | Reject and reset position | station D |
| 100—23 | Discharge of satisfactory cups. | |

The inspection positions 100—2, 100—8, 100—14 and 100—20 are ninety degrees apart in dial 70.

As previously described, at the "cup insert station" shown in Figure 8, the cups K are lifted by the lift rod 126 until they are in place in the cup receiving apertures 100 of the Geneva dial 70. The lift rod 126 remains in place, under the influence of cam 132, until the Geneva dial begins its forward motion and the cup thus moving away from the insert opening 120 is maintained in place in the opening 100 of the Geneva dial, in which it has been inserted. The table 22, in which the insert opening 125 is made, presents a solid bottom for the bottom of the cups except at the insert station 100—1, reject stations 100—3, 100—9, 100—15, 100—21 and at the discharge station 100—23.

The reject gate mechanism of stations A, B, C and D are identical and are illustrated in Figures 4, 8 and 9. The gate mechanism includes a supporting block 308 which is fastened to the table 22 by means of cap screws 309. The block 308 has an overhanging portion 310 in which there is positioned a vertical pivot rod 311. Immediately below the overhanging portion 310, there is attached to the rod a gate operating lever 312, which is normally moved forwardly as shown in Figure 4 (clockwise as shown in Figure 9) by means of the biasing spring 313 upon arm 314 of the gate operating lever. The spring 313 thus imposes upon the lever 312 and upon the pivot rod 311 a clockwise motion as viewed in Figure 9. The lower end of the pivot rod 311 is provided with a crank plate 315 having a crank pin 316 thereon which extends through the discharge gate 317. The discharge gate 317 is pivoted at 318 and rests in a circumferential recess 319 in the table 22, as best shown in Figures 4 and 5.

The crank pin 316 is fitted loosely into a corresponding opening 316a of the discharge gate 317 so as to permit operation of the gate when the pivot rod 311 (and hence the crank plate 315) are rotated. The recess 319 in the table 22 is cut away, as shown at 321, so that normally the discharge gate 317 overlies a portion of each reject openings (positions) in the table 22 below positions 100—3, 100—9, 100—15 and 100—21. Thus, as the Geneva dial moves over a particular reject station, the cup K in the opening 100 of the Geneva dial is supported only by the reject gate 317 and does not drop through the discharge opening. However, when the gate 317 is moved to the open or rejecting position, as shown for station B in Figure 9, it is possible for the cup to be pushed downwardly into the discharge chute 323 (see Figure 4).

The gate operating lever 312 on each of the pivot shafts 311 extends to a position directly over the discharge opening, and the tip 312a of the lever extends in the path of movement of the operating pins 296 carried by the gate operating disc 290. This is best illustrated in Figures 4, 5 and 6. The gate operating lever, being thus in the path of movement of the operating pins 296, can be moved by the pin to the reject position (as illustrated for station B) in the event the operating pin 296 is in the down or reject position. Whenever a pin, corresponding to a particular opening 100, is in the down or "reject" position and has operated arm 312 and gate 317, then upon downward movement of the operating head 267 and the reject rod 280, 281, 282 or 283 of that station, carried by the head moves downwardly and strikes the cup, which being unsupported by the discharge gate is knocked out of the opening 100 in dial 70, and into the discharge chute 323.

Stations A and B are similar in their operations, but differ from stations C and D which in turn are similar in their operation. Hence a description will be made of the type of mechanism at stations A and B and the type of mechanism at stations C and D.

*Stations A and B*.—Referring to Figure 9, station A. The operating pins 296 and reset pins 297, together with their rocker arm 298, are indicated in three successive positions, namely: Position P (preparation for the inspection position), position I (at the inspection position), and position R (at the reject position). As the cup K is raised into the Geneva dial at the insert station, the operating pins 296, reset pin 297 and rocker arm 298 corresponding thereto are 7½° ahead of the opening 100 and are at position P. In this position, there is located a push down rod 270 which contacts with the operating pin 296 as the head 267 descends, and moves the pin 296 downwardly to a position such that, if not retracted, it will operate the discharge gate for station A when the Geneva dial 70 is moved forwardly two steps. This preparatory operation of pushing down the operating pin 296 does not, in itself, insure ejecting operation, since at the next or inspection position I, the operating pin 296 may be reset to non-ejecting position, depending upon operation of the inspecting apparatus.

The inspection is carried out photo-electrically, as hereinafter described, and in the event the cup is satisfactory an electrical impulse is sent through an operating solenoid 350. The solenoid, when operated, draws its core downwardly and the protruding extension on the core strikes the reset pin 297, which is then directly beneath the solenoid at inspection position I, and through the medium of the rocker arm 298, lifts the operating pin 296. In the event the cup K is defective, the solenoid 350 is not operated and the pin 296 consequently stays down.

As the Geneva dial is indexed to the next or reject position R, the operating pin 296, if down, engages the tip 312a of the gate operating lever 312, consequently opening the gate 317 and allowing the reject rod 280 (carried by head 267) to pass downwardly and reject the cup. If the operating pin 296 is in the up position (having been moved to such position by the operation of solenoid 350 when the inspection shows the cup K to be satisfactory) the pin 296 clears the tip 312a of the gate operating lever 312 and the discharge of the cup will not occur.

At position R of station A, there is also provided a reset rod 271, which is positioned so as to push downwardly on reset pins 297 as they come below it. Assuming the operating pin 296 to have been left down at the inspection step (due to the fact that solenoid 350 was not energized thus indicating a bad cup), the pin 296 engages the tip 312a of the gate operating lever 312 consequently moving the lever to the cup rejecting position (as illustrated at station B). On the down stroke of the operating head 267, the discharge rod 280, being thus free to move downwardly, clears the operating lever 312, passes downwardly as shown in Figure 6, discharging the cup K. The adjustment of the length of the ejector rod 280 and that of the reset rod 271 is made such that the lower tip of the reject rod 280 passes downwardly below the level of the gate operating lever 312 prior to the time that reset rod 271 engages the reset pin 297. Hence, when the pin 297 is pushed downwardly as shown in Figure 6 (with the consequent raising of the operating pin 296), the gate operating lever 312 will move under the influence of the biasing spring 313 into engagement with the reject rod 281. Then as the operating head 267 is again raised, the lower end of the reject rod 280 clears the gate operating lever 312 which then moves the gate 317 to the closed position.

The reset rod 271 at station A pushes down upon each reset pin 297 which comes beneath it. It is understood, of course, that most of the pins 297 are already down having been pushed down by the operation of solenoid 350 for satisfactory cups. It is only when a cup is unfit and is rejected that resetting is necessary. The pins 297, leaving station A, remain reset until they reach the preparation position P of inspection station B at which time the push down rod 272 above the operating pins 296 causes the downward movement of said operating pins with consequent lifting of the reset pins 297. The sequence of operation through station B then ensues identically with that of station A except that the photo-electric inspection is responsive to a different type of defect, as will hereinafter be described.

*Stations C and D.*—These steps are of the type wherein the operating pins 296 remain up until pushed down by the operation of solenoids 352 (or 353) at the inspecting positions of these stations. For example, if a cup is defective at the inspection position I of station C, the solenoid 352 is energized with consequent actuation downward of the operating pin 296 and movement upward of the reset pin 297. Then as the Geneva dial and gate operating disc 290, and all the mechanisms thereon are moved another step to the reject position R of station C, the pin 296, when set downwardly engages the tip 312a of the gate operating lever 312, operates the gate 317 and permits discharge of the cup by the reject rod 282. As the gate operating lever 312 has been moved out of the path of the discharge rod 282, the rod moves downwardly as the head 267 descends, and ejects the defective cup. Then with further downward movement of the head 267, the rod 274 strikes upon the top of reset pin 297, raises the operating pin 296, releases lever 312, which then moves under influence of spring 313 into engagement with the then down reject rod 282. As the operating head 267 again moves upwardly, the tip of the rod 282 clears the gate operating lever 312, permits it to move under the influence of spring 313 and the gate 317 of station C closes. At the reset position R of station C, all of the reset pins 297, which may be up, are pushed downwardly thereby leaving each of the operating pins 296, corresponding to each opening 100, in the up position for actuation by the solenoid 353 at station D.

The operation of station D is identical with station C, except that the photo-electric mechanism, as hereinafter described, is responsive to defects in a different portion of the cup.

*Solenoids.*—The guide plate 286 in addition to serving as the guides for the reject rods 280—283, discharge rod 284, and the set and reset rods 270—275 also serves to support a plurality of solenoids 350, 351, 352 and 353, which are positioned as shown by the dotted lines in the plan view of Figure 9. The solenoids are identical and therefore the description of one of them will suffice for all.

As shown in Figure 4, the solenoids are mounted on a bracket 355, which hangs downwardly from the lower surface of the guide plate 286. The solenoid winding 356 is of the direct current type adequately insulated and is wound upon a brass tube 357. The solenoid core 358 of magnetic material has fastened thereto a downwardly extending rod 359 of brass or other non-magnetic material. The core 358—359 is mounted for vertical oscillation and is normally biased upwardly by means of spring 360 which is attached to an adjustment screw 361. When energized with direct current, the solenoid core 358—359 is drawn downwardly and strikes the reset pin 297 (stations A and B), or the operating pin 296 (stations C and D). It may be noted that the solenoids 350 and 351 at the inspecting positions of stations A and B respectively, push down upon the reset pins 297 and do so for every satisfactory cup which is inspected at these stations, whereas the solenoids 352 and 353 at stations C and D respectively, are positioned so as to push down upon the operating pins 296 and do so only for such cups as inspection proves to be unsatisfactory.

*Photo-cells and light sources.*—At station A, the photo-cell and the light source for carrying out the inspection are positioned as shown in Figure 16. The light source, generally designated 325, is mounted in a housing 326 and includes a high candle power concentrated filament lamp bulb 327. The housing includes a condensing and focusing lens system 328 and the housing 326 is mounted upon the guide plate 286 in the position shown in Figures 8 and 9 immediately above cup carrying hole 100—2 corresponding to the inspection position I at station A. The light source is focused so as to be aligned with the opening K—1 of cup K (Figure 16), and so as to pass directly downwardly through the hole. The cup K is punched with hole K—1 at the bottom for receiving the primer cap of a shotgun shell. The opening K—1 is polygonal here, and normally the tips K—2 project directly into the cup. When such is the case, a sufficient quantity of light passes through the opening to operate the photo-electric system. When the cup is not punched or if the tips are bent, the quantity of light passing through the opening is insufficient to operate the photo-electric system. Beneath the table 22, there is positioned a photo-electric unit, generally designated 330, containing a photo-electric cell 331 mounted in a suitable manner within the shell 329. The unit is provided with an adjustable light collecting lens 332, which serves to concentrate the collected light upon the photo-electric cell 331 within the unit. Where the light transmitted through the opening K—1 is of sufficient quantity, the photo-electric cell is activated and by means of an amplifying circuit, hereinafter described, effects an energization of solenoid 350 (inspection positon I of station A) thereby operating the solenoid to push the reset pin 297 downwardly and lifting the operating pin 296 so as to permit the cup there undergoing inspection to be passed at the reject position R.

At stations B, C and D, the light source units and the photo-electric cell units are substantially the same as those used at station A, except that they are mounted above table 22 on suitable adjustable brackets as shown in Figures 1, 2 and 8, and the light sources of stations B, C and D are each provided with a slight marking aperture so that the light is projected in a thin flat beam as more fully explained hereinafter.

The arrangement of the light source and photo-electric cell of station B is shown schematically in Figure 17, the light source 325 being positioned so as to project a narrow flat beam of light oriented in a vertical plane on to what is the normal position of the upper chamfered edge K—3 of the shotgun shell cup. The light is normally reflected to the photo-electric unit 330. which in turn controls energization of solenoid 351 of station B through circuits hereinafter described. At station B, the shotgun shell is rotated by a spinner mechanism heretofore described, and the light beam thus projected upon the edge, "inspects" the entire upper edge of the cup as it is rotated. Where the shotgun shell cup is too long or too short and any place throughout its edge, or where it is not chamfered, the light is reflected or transmitted along paths 334—334 as conditions of the cup allow, this being different than the normal path 335 of light reflected to the photo-electric unit 330. If, at any time during the rotation of the cup, light is reflected along the normal path 335 to the photo-electric unit 330, the solenoid 351 is operated, and as the result, pin 296 is raised and consequently does not strike the gate operating arm 312 at the reject position of station B. Reject gate 317 therefore remains closed, and the cup K is passed as satisfactory. If during the rotation of the cup K at station B, there is no light reflected along normal path 335, the solenoid 350 remains unoperated, pin 296 remains actuated and consequently strikes the gate operating lever 312 with resultant rejection of the thus inspected defective cup.

The light source and photo-electric unit arrangement used at station C is shown diagrammatically in Figure 18, the light source 325 being positioned so as to focus a narrow slit of light oriented in a vertical plane, upon the knurl K—4 of the shotgun shell cup from which the light is normally reflected to the photo-electric unit 330 along the normal path 336. Should the knurl be interrupted at any part of the circumference of the cup K, light will be reflected along path 337 thus producing a variation in the response of the photo-electric unit at station C, and through a suitable amplifying circuit, hereinafter explained, will produce an actuation of solenoid 352 with consequent subsequent rejection of the defective cup at the reject position of station C. If the knurling K—4 is complete throughout the circumference of the cup, light will be reflected uniformly as the cup is rotated by the spinner mechanism during inspection, along the normal path 336, and such uniform response will not, in the amplifying circuit hereinafter described, produce an actuation of solenoid 352 .

It may be pointed out here that inspection of the upper "knurl" K—4 is ordinarily sufficient, since normally both the upper and the lower "knurls" of the cup are made in one operation. However, if desired, both knurls may be inspected simultaneously with separate light beams and either one of which may be used as the responsive impulse for actuating solenoid 351, or the two knurls may be inspected separately at successive stations.

The light source and photo-electric unit of station D is shown schematically in Figure 19 wherein the light source is positioned so as to project a narrow vertical plane beam of light along a path 338 onto the chamfered edge K—3 of the shotgun shell cup K. As the cup is rotated, the light is reflected along the normal path 339 to the photo-electric unit 330. If the chamfered edge K—3 of the cup is bent as shown at K—6, or nicked as shown at K—7, a variation in the light reflected along path 339 will occur and such variation in reflected light will, in the amplifying circuits hereinafter described, produce an actuation of solenoid 353 with consequent subsequent rejection of the defective shotgun shell cup. If the chamfering is uniform and regular and there are no bends or nicks in the shotgun shell cup, the light reflected along the normal path 339 will be uniform and the solenoid 353 will consequently not be actuated with the result that the shell is passed at the rejection position of station D.

*Amplifying apparatus.* — Two types of amplifying circuits are utilized in the apparatus herein illustrated and described. Each amplifying circuit is a complete unit and has its own power converter (power pack) independent of all other amplifying circuits of other stations. Each amplifying apparatus is preferably separately housed on an individual panel adjacent the inspecting machine.

Type AB amplifying circuit used at inspecting stations A and B is designed so as to provide a direct current impulse response for operating the solenoid 350 (or 351) as the case may be, if at any time during the inspection of the cup K at such stations, a predetermined quantity of light falls upon the photo-cell unit.

Referring to Figure 21, the amplifying circuit comprises a power pack, generally designated 370, comprising a transformer 371 having a primary 372 for connection to suitable alternating current source. There are three secondaries of the transformer 371, one of them, winding 373, being provided for the filaments of the electron tubes of the amplifier. Winding 374 provides for energization of the filaments of half-wave rectifiers 375 and 376, whereas winding 377 provides the plate potential for these rectifiers. The output of the rectifier is communicated by means of leads 378 through a filter network 379 to a voltage dividing and loading resistor 380, from which direct current at various potentials is drawn for the operation of the amplifying circuit. One terminal of the resistor 380 is grounded at 381 as indicated.

The photo-electric cell 331 (stations A or B) is connected by leads 382 and 383 to a pentode amplifying tube, generally designated 386, lead 382 being connected to the screen grid 384, and lead 383 to the grid 385. The filament 387 of the tube is connected by leads 388 to terminal F—F of the filament section 373 of transformer 371. Around the filament 387, there is a shield 389 which is connected by lead 390 to a variable tap 391 of dividing resistor 380, the power supply. The screen grid 384 is connected by lead 392 to another variable tap 393 of the dividing resistor 380. The circuit from plate 394 of the amplifier 386 is connected by lead 395 to resistor 396 and thence through a milliammeter 397 to lead 398, and to one terminal of the winding of a high sensitive relay 399, the other terminal of said relay winding being connected by lead 400 to one terminal of the dividing resistor 380. The contact 402 of the relay 399 is connected by lead 403 to a variable tap 404 of the dividing resistor 380, and the armature operated contact 405 of relay 399 by a lead 406 directly to the grid 411 of the four-element amplifying tube 410. The lead 406 is grounded at 407 through resistor 408. The tube 410 is provided with a filament 412, which is connected by leads 414 to terminals F—F of the filament section 373 of transformer 371, and the filament shield 415 is connected by lead 416 to the variable tap 417 of resistor 418. The resistor 418 is grounded at 419 and its opposite terminal is connected by lead 420 to variable tap 421 of dividing resistor 380. The plate 422 of tube 410 is connected by lead wire 423 to the winding of operating solenoid 350 or 351 (of station A or station B), and thence by lead 424 to the armature contact 425 of relay 426. The stationary contact 427 of relay 426 is connected to lead 398. Contacts 425 and 427 of relay 426 are bridged by a resistor-condenser circuit 428. One terminal of the winding 429 of relay 426 is connected to one side of an alterating current power source 432, the other side of said power source being grounded at 430. The other terminal of the winding of relay 429 is connected by lead 431 to the stationary contact of switch 435, the movable contact of which is mounted on the crosshead 42 of the inspection machine, said switch being operated at each down stroke of the crosshead 42 near the bottom of the stroke so as to ground and thereby close the circuit through winding 429 of relay 426, with resultant opening of contacts 425 and 427.

The amplifier 410 is of the thyratron type, that is it normally does not pass current until the voltage on grid 411 reaches a predetermined amount after which the tube begins to pass current and continues to pass currents regardless of the voltage of grid 411, until the plate circuit is interrupted.

The operation of the type AB amplifying circuit is as follows:

The power applied to the primary of transformer 372 produces an energization of secondaries 373, 374 and 375 with consequent energization of the filaments 378 and 415 of tubes 386 and 410 respectively. The rectifying tubes 375 and 376 are likewise energized and produce a pulsating direct current across leads 378, which, by virtue of the filter network 379, produces a substantially constant direct current potential across the dividing resistor 380, which accordingly serves as a power source for the remaining circuits. The variable taps 393 and 391 are adjusted so that the normal output of the amplifier 386 is insufficient to operate relay 399 when the photo-electric cell 331 is insufficiently illuminated as when the cup K of station A has a bent in tip K—1 (Figure 16) or the reflected light at station B is along abnormal paths 334 for unfit cups rather than path 335 for satisfactorp cups (Figure 17). The milliammeter 397 is included for convenience in making such adjustments. When the photo-electric cell 331 is sufficiently illuminated, as it is with satisfactory cups, the potential of grid 385 of amplifying tube 386 is changed thereby effecting an increase in the current output from the plate 394. As the output increases to a predetermined maximum, relay 399 is operated thereby closing contacts 405 upon contact 402, thus establishing a circuit from ground point 381 on resistor 380 through a portion of resistor 380, tap 404, lead 403, contacts 402 and 405 of relay 399, lead 406, resistor 408 to ground 407. The potential of lead 406 is normally low being grounded at 407 through resistor 408. However, when the circuit just described is established, sufficient current is passed to raise the potential on line 406 with consequent increase in the potential of grid 411 of the thyraton 410. This causes the thyraton 410 to discharge through a circuit as follows:

From tap 421 on resistor 380 through line 420, a portion of resistor 418, tap 417, line 416, shield 415, thence to plate 422 of the tube 410, through lead 423 through the coil of solenoid 350 or 351, as the case may be, thence through lead 424 and contacts 425 and 427 of relay 426, which are then closed, thence through lead 389 to the winding of relay 399 and through a portion of resistor 380 to tap 391. Current thus flowing through the work solenoid 350 or 351, as the case may be, causes the solenoid core to be drawn downwardly and causes consequent actuation of the reset pin 397 corresponding to the cup undergoing inspection. The flow of current through the solenoid 350 or 351 continues during the time that the head 367 moves downwardly, and until it reaches nearly the bottom of its stroke at which time the crosshead 42 has brought the movable contact of switch 435 into engagement with its stationary contact thereby grounding the winding 429 of relay 426. When this occurs, the circuit is established from the power source 432 through the winding 429, thence through the closed contacts of switch 435 to ground 430, and thence to the ground of the other line of the power source 432. Relay 426 is consequently energized opening contacts 425 and 427 thereby interrupting the flow of current through the thyratron tube 410, with consequent cessation of the flow of current through the work solenoids 350 or 351.

The flow of current through the thyratron is very heavy as compared with the flow of current through the amplifying circuits prior to the establishment of flow through the thyratron and this consequently greatly disturbs the voltages applied by resistor 380 to the amplifying tube 386. However, during this period, the photoelectric inspection, which had initiated the circuit operation, had already been made and therefore the disturbances produced in the amplifying circuits are of no consequence. Upon the opening of relay contacts 425, which occurs at or near the lowermost position of crosshead 42, the thyratron plate circuit is broken and during the subsequent up-travel of the crosshead 42 and concurrent indexing of the Geneva dial 70, to the next subsequent position, the power pack 370 is again unloaded and stable conditions are again established.

It is to be understood that at stations A and B, the energization of solenoid 350 or 351, as the case may be, occurs for each cup which is found to be satisfactory causing operation of the solenoids 350 or 351, and consequent downward motion of the cores of such solenoids so as to press downwardly the reset pins 297 corresponding to the cups being inspected then directly under the solenoid. Consequently, this causes elevation of the actuating pin 296 and the cup is not rejected at the reject position following inspection. When insufficient light falls upon the photo-cell 331, actuation of the solenoids 350 or 351 does not occur, reset pin 297 is not pushed down and actuating pin 296 is not elevated. Consequently, upon the next subsequent indexing movement of the Geneva dial 70, the actuating pin 296 being down, engages the gate operating arm 312 as heretofore described, thereby permitting the reject rods 280 or 281, as the case may be, to push the defective cup downwardly out of the hole 160 in the Geneva dial 70 and into the discharge chute 323.

Type CD amplifying circuits used at inspecting stations C and D are designed so as to provide a direct current impulse response for operating the solenoids 352 and 353 of stations C or D respectively in the event the light reflected to photoelectric unit 330 at said stations is of variable intensity (as contrasted with constant intensity), during the rotation of the shotgun shell cup K at the inspecting positions I of the stations C or D.

The amplifying circuits of the CD type are illustrated in Figure 22, and include separate power pack units 437 and 438 for supplying power to the amplifying tube, generally designated 450, and the thyratron tube, generally designated 490, respectively. The power pack 437 is essentially the same as the power pack 370 of the type AB circuit illustrated in Figure 21 and will not be described further than to say that it supplies a direct current potential across resistor 439, which then serves as the source of direct current supply for the amplifying network of tube 450. The resistor 439 is grounded at 440. The amplifying tube 450 is of the pentode type and includes a filament 451 connected by leads 452 to the filament transformer section F—F of the power pack 437, the filament shield at 454, being connected by lead 455 to tap 456. It is noted in this connection that the section of resistor 439 between the tap 456 and ground 440 can be varied by means of the adjustment 457. The grid screen 458 of the pentode is connected by one lead 459 to one terminal of the photo-cell 331 of the photoelectric unit 330 at stations C or D, as the case may be. Each of the photo-electric cells 331 at stations C and D is provided with a condenser 460, one terminal of which is connected by lead 461 to the opposite terminal of the photo-electric cell 331, the other terminal of the condenser being connected by lead 462 to the grid 463 of the pentode amplifier 450. The condenser 460 is contained within the photo-electric cell housing 330 and is bridged by a resistor 465, the center tap of which is grounded at 467. The screen grid 458 of the pentode is also connected by lead 468 to variable tap 469 on resistor 439.

The plate 470 of the pentode 450 is connected by lead 471 to resistor 472 and thence through milliammeter 473 to terminal 475 of resistor 439. The plate circuit lead 471 is also connected by lead 474 to one terminal 477 of an auto-transformer, generally designated 480. The auto-transformer includes a winding 478 and another winding 479, which are connected together at 481 and grounded at 482. The ungrounded terminal 483 of winding 479 is connected by lead 484 to the grid 485 of the thyratron amplifying tube, generally designated 490.

The separate power pack 438 of thyratron tube terminates in a stabilizing resistor 491 to which bridging resistor 492 is connected by leads 493 and variable tap 494. The filament 495 of the thyratron tube 490 is connected by leads 496 to the filament section F—F of the power pack 437, and the filament shield 498 by lead 499 to a variable tap 500 on the bridging resistor 492. The plate 502 of the thyratron 490 is connected by lead 503 to the winding of solenoid 352 or 353, as the case may be, the opposite terminal of which winding is connected by means of lead 505 to the armature contact terminal 506 of relay 510. The stationary contact 507 of said relay is connected by lead 508 to the terminal 509 of the stabilizing resistor 491. The contacts 506 and 507 are bridged by a condenser-resistor circuit 504. One terminal of winding 511 of relay 510 is connected by lead 512 to one side of an alternating current power source 513, the other terminal of which is grounded at 515. The opposite terminal of winding 511 is connected by lead 516 to a stationary contact of switch 435, previously described with reference to the type AB amplifying circuit shown in Figure 21, the movable contact of switch 435 being carried by the crosshead 42 of the inspecting machine.

It is noted here that the movable contact of switch 435 is positioned so as to be closed to ground and at or near the lower position of the crosshead 42 on its down-stroke thereby closing the circuit to the coil of relay 510.

The operation of the type CD amplifying circuit is as follows:

Power being applied to the power packs 437 and 438 resistors 439 and 491 supply direct current potentials to the amplifying network of amplifier tube 450 and to the circuits of the thyratron 490. The thyratron, however, does not as yet operate, since it is responsive to the amplifier 450. During the inspection of any cup K at the inspection positions I of stations C and D, a beam of light is projected against either the knurl K—4 (as in Figure 18, station C) or the chamfered upper edge K—5 (as in Figure 19, station D), and is normally reflected back to the photo-electric cell 331 at such station which therefore normally establishes predetermined potential conditions upon the grid 463 and screen grid 458 of the pentode 450. By suitable adjustment of the variable resistor section 457 of resistor 439 and by adjustment of the tap 469, a predetermined plate output from pentode 450 may be obtained as indicated by the milliammeter 473, and such plate potential is communicated to the tap 477 of the auto-transformer 480, and thence to ground 482. Winding 479, however, has no voltage induced in it because such steady reflected light produces only a steady current in winding 479. If during the rotation of cup K during such inspection, the knurl K—4 of the shotgun shell cup is interrupted (station C illustrated in Figure 18), or if the chamfer K—5 is irregular, or the cup K is bent as shown at K—6, or nicked as shown at K—7 (station D illustrated in Figure 19), the photo-electric cell 331 at such station will produce a variable potential upon the grids of pentode 450 and a consequent variable output in the plate circuit of said tube, the variable output being communicated to the auto-transformer 480 by lead 472. The variable currents in auto-transformer winding 478 produces a voltage in winding 479 and communicates it by means of lead 484 to the grid 485 of the thryratron. If the defect causing such variation is of a predetermined sufficiently great magnitude, the thyratron operation is begun under control of the gird 485 and plate current of the thyratron flows from tap 500 of resistor 492 to the filament shield 498 of the thyratron 490, thence to plate 502, lead 503 to one terminal of the work solenoid 352 or 353, as the case may be, then from the opposite terminal of said solenoid by lead 505 to the movable contact 506 of relay 510, and since said relay is then de-energized, through contact 507, lead 508 to terminal 509 of resistor 491, thence through tap 494 to resistor 492 and tap 500 thereof. The thyratron plate current having been established is maintained regardless of the potential on grid 485 until it is interrupted by operation of relay 510. The operation of relay 510 is exactly analogous to relay 426 of the type AB circuit, illustrated in Figure 21, and serves to interrupt the plate current of the thyratron when the crosshead 42 of the inspecting machine has reached a predetermined low position at which time it closes contacts 435 thereby grounding the relay coil 511, which being energized, raises armature 506 and breaks the plate circuit of tube 490 through that armature to the stationary contact 507. The plate circuit of thyratron 490, being thus opened, consequently de-energizes the work solenoids 352 or 353.

Hence, when a given shotgun shell cup K is at the inspecting position I of stations C or D and being defective produces the aforesaid energization of work solenoids 352 or 353, the latter, being energized, serve to force the actuating pins 296, corresponding to the defective cup K, downwardly and the pins remain down under the influence of the biasing spring 304. Thereafter, as the Geneva dial 70 is indexed to move the thus inspected cup to the reject position of stations C or D, the pin 297, being down intercepts the tip 312a of the reject gate operating lever 312 and this effects an opening of the reject gate 317. The lever 312, being out of the path of the downwardly moving reject rod 282 or 283, and the discharge gate 317 being thus opened, the reject rod 282 moves downwardly, strikes the defective cup and rejects it into the discharge chute 323 at the reject positions R of stations C or D. This action is illustrated in Figure 20.

The downward movement of the reject rods 282 or 283 is accompanied by the downward movement of the reset rods 274 or 275, respectively, and therefore the reset pins 297 are forced downwardly by the reset rods, and the actuating pins 296 are consequently raised. The reject gate operating lever 312 consequently moves under the influence of spring 313 into contact with the then down reject rods 282 or 283. As the reject rod is again raised by operating head 267, it will again clear the gate operating lever 312 and permit said lever to resume its normal position thereby closing the reject gates 317.

*Exemplary operation.*—In this operation, it is assumed that a plurality of cups K are fed into the downwardly extending curve chute 60 and that the machine is being driven continuously, and that amongst the cups K, most of which are satisfactory in all respects, there are a plurality of defective cups as follows: One defective cup is satisfactory in all respects except that the bottom hole K—1 is too small or does not exist at all, or one of the inturned tips is bent over, another defective cup has a hole K—1 of proper size and condition, but the sidewall is too long or it is not chamfered, as shown in Figure 17, another defective cup has a proper hole K—1, is of proper length, is satisfactorily chamfered, but the knurl K—4 is incomplete at one portion of the circumference, and finally a defective cup which is of the proper length, it is chamfered, adequately punched at K—1, adequately knurled at K—4, but in which the chamfer K—5 is irregular, or the upper edge of the sidewall bent or nicked.

The cups are fed into the chute 60, and one by one, reach the feed slot 105. The machine, being in operation, the shaft 113 of the feeding mechanism is rotated at the same speed as the main drive shaft 24 through the medium of gears 116 and 117. One by one the cups are moved to the left as shown in Figure 10 and after the injector 107 has moved the cup over the then lowered lift rod 126 and as the injector begins to retract, the lift rod is elevated under the influence of cam 132 thereby lifting the cup K upwardly through the bushing 120 into one of the openings 100 of the Geneva dial 70, the Geneva dial being then halted by the action of the Geneva driving mechanism and locked in place through the action of the upper end of the Geneva drive shaft 79 (and through the action of the Geneva dial locking pin 141, where the latter is used). After being fed into the Geneva dial, the cups are carried by the dial, in a clockwise direction as shown in Figures 8 and 9, and in traversing through approximately one revolution of the Geneva dial 70, are subjected successively to inspections at stations A, B, C and D.

Referring particularly to station A, the cup which is adequate in all respects except that it is unsatisfactorily punched at the hole K—1, is fed into the dial at the opening 100—1, Figure 8. While at this position, the push down rod 270 is lowered by the down stroke of operating head 267, and pushes down on the operating pin 296 corresponding to the cup being inserted. This pin 296 is at the preparation position of station A while the cup to which it pertains is at the insert station 100—1. The Geneva dial is then indexed through another step, 15°, by the rotation of shaft 74—79, and is again caused to pause. The cup, which is incompletely punched, is then in the position 100—2, the inspection position of station A, and illumination from light source 327, Figure 16, is projected downwardly against the cup, and since the hole K—1 is not in existence or is not as large as it should be, an insufficient amount of light falls on the photo-electric cell 331. Due to the fact that the illumination on the photo-electric cell 331 is insufficient, the thyratron 410, Figure 21, does not achieve the condition of passing current, and as a result, the solenoid 350 is not energized. Accordingly, the core of solenoid 350 does not push down upon the reset pin 297 (which was lifted when the pin 296 was pushed down at the preparation position of station A). The Geneva dial is then indexed through another step thus bringing the cup K, which has now been inspected, to the reject position 100—3 of station A. By virtue of this indexing movement, the operating pin 296, which remained down, moves against the gate operating lever 312 thereby swinging it to the cup rejection position (this position being illustrated at station B). Thus, the gate 317 is opened, and the operating lever 312 is moved out of the path of the reject rod 280 at station A, and as the head 267 descends, the reject rod 280 moves straight downwardly, strikes the defective cup and the cup is pushed into the reject conduit 323. The rod 280 is lowered past the arm 312 before the reset rod 271 strikes the top of the resetting pin 297. As the rod 271 pushes down on the pin 297, thereby elevating the operating pin 296, the gate operating lever 312 is freed and moves, under the influence of spring 313, into contact with the then down reject rod 280. As the head 267 again raises, the lower end of rod 280 clears the gate operating lever 312 and the latter moves to the gate closed position.

It may be pointed out here that by moving the block 308 carrying the gate operating lever 312 to a position in advance of its illustrated position (i. e. moved in a direction opposite to the direction of rotation as in Figure 9), the gate operating lever 312, when in the gate operating position, will lie in an over-center position with just the tip 312a of the lever in contact with the operating pin 296. Then as the dial moves further, the pin 296 will simply move the lever 312 a little bit further and will ride off the tip 312a thereby allowing the lever to snap back to the gate closing position. Such construction makes it unnecessary to have the reset pins 271, 273, 274 and 275 at the positions shown, since the closure of the gate is effected merely by the pins 296 slipping off the end 312a of the gate operating lever 312. However, such an arrangement necessitates placing a "preparation" pushdown rod in "preparation" positions ahead of the "inspection" position of stations C and D, so as to insure that all reset pins 297 are in the down position prior to the inspection position at such stations.

It may be assumed that the next defective cup among those fed into the machine, is the one which is adequate in all respects except that it is too short, too long, or is lacking in chamfer. This cup, upon reaching station A, is tested for the existence and adequacy of the bottom hole K—2, and since it is satisfactory in this respect, is passed at that station.

When the assumed cup reaches the preparation position of station B, the push down rod 272 moves into engagement with the operating pin 296, and pushes it to the "prepared," (down), position. Upon the next indexing movement of the Geneva dial, the cup is brought to the inspection position 100—8 of station B, Figure 8, and just after the Geneva dial is brought to a stop, the rotation of gear 223 is such that the lobe 219 of the cam 220 rides off the roller 217 of arm 214 thereby allowing the arm to elevate under the influence of spring 214, consequently lifting the continuously rotating spinner rod 281. The tip 257 of the spinner rod being movable slightly, easily finds its way into the opening K—1 of the cup and as the rod is rotating, the cup is rotated while at the station 100—8. Illumination from the light source 325 at station B falls upon the upper edge of K—3 of the cup as shown in Figure 17, and instead of being reflected along the normal path 335, it is reflected downwardly into the cup or misses the cup entirely along the paths 334. The lack of illumination upon the photo-electric cell 331 has the result that solenoid 351 at station B is not operating and the pin 297 is not pushed down when at the inspection station; accordingly, the actuating pin 296 is not elevated.

The Geneva dial is then indexed through another step to the reject position 100—9 of station B, Figure 9, and in so doing, the pin 296 moves into engagement with the gate operating lever 312 thereby moving the reject gate 317 to the position shown in Figure 9. As the head 267 descends, the reject rod 281 pushes the defective cup into the reject conduit.

It may be assumed that the third defective cup among the cups passing through the machine is of the type which is satisfactory in all respects except that the knurling K—4 is incomplete at one portion of the cup sidewall. This cup, being adequately punched at K—1 and of satisfactory length, meets the inspections imposed at stations A and B. However, when the cup reaches the inspection position 100—16, station C, Figure 8, it is revolved by elevation of the spinner rod into contact with the cup, and as light from the light source 325 at station C is projected against the knurling K—4, as shown in Figure 18, it is reflected along the path 336. As the cup is rotated, light ceases to be reflected where the knurling is incomplete and as the result, there is an instantaneous cessation in illumination falling upon the photo-electric cell unit 330 at station C. Amplifying circuit at station C, being of the type shown in Figure 21, such cessation in the illumination of cells 331 results in an amplified alternating current impulse being transmitted through the transformer 480 and this results in initiation of the operation of thyratron 490, which, upon operating, establishes a circuit through the solenoid 352. The solenoid 352 being energized, its core moves downwardly into contact with the pin 296 at the inspection position of station C, and pin 296 is then moved to its lower-most condition. As the Geneva dial 70 is then indexed to the reject position of station C, the pin 296 moves into contact with the gate operating arm 312, as heretofore described, with the result that the defective cup is ejected.

If it is assumed that the next defective cup among the cups fed into the machine is of the type which is satisfactory in all respects except that the chamfer K—5 is irregular, or the upper edge of the sidewall is bent as shown at K—6 or nicked as shown at K—7, Figure 19, said cup will pass the inspections for adequacy of pierce hole K—1, station A, for length of cup sidewall and the existence of chamfer as at station B, and for existence and regularity of knurling as at station C. As this cup reaches the inspection position I of station D, illumination from the light source 325 is projected as shown in Figure 19 against the chamfered upper edge of the sidewall and is reflected along the normal path 339 to the photo-electric cell 331 as the cup is rotated. However, since the chamfering is irregular, or the sidewall is bent, or nicked, the reflected light will vary slightly in amount as the cup is rotated. In this connection, it is noted that the light along path 338 is preferably in the form of a narrow flat beam arranged in a vertical plane so that the inspection will be for a precise narrow portion only of the sidewall upper edge. The reflected light, being variable, an impulse is sent through the amplifying system, Figure 22, as described for station C, with the result that the flow of current through thyratron 490 is initiated and solenoid 353 operated. This has the effect of pushing down pin 296 at inspection position 100—20 of station D, and this results in the ejection of the thus defective cup at the reject position 100—21 of station D.

All cups which are satisfactory in all respects are passed by stations A, B, C and D, and are automatically ejected at discharge station 100—23 by virtue of the action of discharge rod 284, which strikes all cups as they are brought to that station.

It is obvious that there may be as many stations as there are conditions to be inspected. Thus, an additional station may be supplied to test for existence of knurl and then another supplied for regularity of knurl. Addition of stations will, of course, in some instances require a Geneva dial of greater diameter having a larger number of cup carrying holes therein, and the gearing carrying cam 220 will have to be modified to accommodate lifting of the spinner mechanisms at such of the stations as require spinning.

These and many other obvious variations will be apparent to those skilled in the art and such are intended to be within purview of the invention herein illustrated, described and claimed.

What I claim is:

1. Mechanism for inspecting a cylindrical part having an axial polygonal hole, said mechanism comprising a plate having a series of uniformly spaced openings, means for inserting a part in each opening, means for intermittently moving the plate to successive stations, a rotating spindle having an end key for fitting into the polygonal hole of the part, means for moving the spindle axially so as to insert the end key of the spindle into the polygonal hole whereby the spindle rotates the part, means for inspecting the part, and means for ejecting defective parts from the mechanism.

2. Mechanism for inspecting a cylindrical part having an axial polygonal hole, said mechanism comprising a plate having a series of uniformly spaced openings, means for intermittently moving the plate to successive stations, means at one station for inserting the parts to be inspected in said openings to be carried thereby, a spindle means having a floating key extending axially from one end thereof, means for rotating said spindle, said spindle also being mounted for axial movement so as to bring the axial key into engagement with the polygonal hole at another station thereby to rotate the part while at said other station, means for inspecting the part including a light source and a photo-electric cell operable by light reflected from a portion of the cylindrical surface of the part while rotated, and means responsive to the means for inspecting for ejecting defective parts.

3. A mechanism for inspecting a cylindrical part comprising a dial having a series of uniformly spaced openings in the dial, means for inserting cylindrical part to be inspected in each opening, means for intermittently advancing the dial to successive positions, a table beneath the dial normally retaining said parts in their openings, rotatable means insertible from beneath into an opening in the part to rotate the part, means for inspecting a part at a given one of said positions while so rotated, and means for ejecting a part found to be defective.

4. A mechanism for inspecting a cylindrical part comprising a cylindrical plate having a series of uniformly spaced openings, means for inserting in each opening, and from beneath a cylindrical part to be inspected, means for intermittently advancing the plate to successive positions, an operating head reciprocating vertically in timed relation to the advancing means, a table beneath the plate normally retaining said parts in their openings, means for inspecting a part at a given one of said positions, means for rotating the part while being inspected, and means including rods carried by said operating head for ejecting a part found to be defective at said given position.

5. A mechanism for inspecting hollow parts of cylindrical shape comprising a plate and means for intermittently advancing the plate by uniform steps, said plate being provided with a cylindrical part receiving openings evenly spaced apart at a distance equal to the distance advanced by the plate in each uniform step, means for rotating the parts about their axes, light means for projecting a narrow beam of light across the edge of the cylindrical part as it is rotated for inspecting the length and edge of the cylindrical part, ejection control means movable to ejecting and non-ejecting positions, and photo-cell means responsive when light is reflected from the edge of the cylindrical part to the cell at any time during rotation of the part for positioning said ejection control means in non-ejecting position, and means responsive to said ejection control means when in the ejecting position for ejecting a part from which light is not reflected to the photo-cell at any time during rotation.

6. A mechanism for inspecting cylindrical parts comprising a carrier, means for intermittently advancing the carrier by uniform steps through a plurality of stations, part holders mounted for rotation on the carrier for holding the parts being inspected, the axis of rotation of said part holders being transverse to the direction of motion of the carrier, means at one station for inserting the cylindrical parts into each of the carriers as it reaches said station, rotary spindle means at a second station mounted for axial movement toward and away from parts in said rotary part holders for temporarily rotating said parts while at said second station, light means for projecting light onto the cylindrical parts and photo-cell means responsive to reflected light, and means for ejecting from the carrier the parts which do not reflect light to the photo-cell during rotation by said spindle.

7. A mechanism for inspecting cup-shaped parts of generally cylindrical shape having an opening in the bottom of the cup along the axis thereof comprising a carrier of generally circular shape, means for intermittently rotating the carrier through a number of equal angular steps past a plurality of stations, part holders mounted for rotation on the carrier for holding the parts being inspected, the axis of rotation of said part holders being transverse to the direction of motion of the carrier, means at one station for inserting a cup-shaped part axially into each of said part holders as the holders are advanced step-by-step to a first station, continuously rotating spindle means at a second station, said spindle having an end portion for fitting into the openings in the bottoms of the cups, means for moving the spindle axially periodically in timed relation with the movement of the carrier for inserting the end of the spindle into the holes of each of the cups as the cups are brought to said second station for rotating the cup, light means for projecting a beam of light against cups while so rotated, and means responsive when light is reflected at any time during rotation for passing the part at a third station and when light is not reflected for ejecting the part at said third station.

8. A mechanism for inspecting cylindrical objects for perfection of dimension and uniformity comprising a carrier plate, means for rotating the carrier plate past a number of stations by a step-by-step rotary motion about an axis perpendicular to the plate, there being a whole number of steps for one revolution of the plate, said carrier plate being provided with object holders spaced uniformly therearound, there being as many such object holders as steps required for one revolution of said plate, each object holder being an anti-friction race mounted on the carrier plate, the inner portions of the race being shaped to fit the objects being inspected so that the objects may be rotated with the race relative to the carrier plate, means at one carrier plate station for feeding the cylindrical objects axially into the races as they are brought to said station, means at an inspecting station for engaging and rotating the object and the race in which the object is positioned, a light source for projecting a narrow beam of light onto cylindrical object as it is rotated, photo-cell and amplifier means responsive to reflected light, ejector control means moving to ejecting and non-ejecting positions adjacent each race, means ahead of the inspection station for moving the ejector control means to ejecting position and means at said inspection station for moving the ejection control means to non-ejecting position in response to light reflected from the cylindrical object undergoing test as it is rotated at said inspection station.

9. A mechanism for inspecting a cylindrical part comprising a dail having a series of uniformly spaced openings, means for inserting a cylindrical part to be inspected in each opening, means for intermittently advancing the dial to successive positions, the spacing of the angular distance between successive positions being equal to that between adjacent openings of the dial, a table beneath the plate normally retaining said parts in their openings in the dial, an opening in the table at an ejector station, an ejector gate for supporting parts to be moved past said ejector station and for allowing ejection of defective parts, a reciprocating actuator movable toward the dial at the ejector station for engaging and ejecting a part at said station, and a means movable with the ejector gate into a position interrupting the movement of the reciprocating actuator when the ejector gate is closed and out of a position to interrupt the movement of the reciprocating actuator when the ejector gate is open.

10. A machine for inspecting parts comprising a table, a dial rotatively mounted on the table, said dial having a plurality of part holders evenly spaced angularly around the rotational axis of the dial, means for moving the dial step-by-step through angular distances equal to the angular spacings of the part holders for bringing the holders and parts therein successively past work stations, means for feeding parts into the holders at a feeding station, said parts being moved tightly into the holders, an inspection station and a defective part discharge station, said table being cut away at the discharge station, a gate normally closing said opening, a reciprocating part-ejecting punch rod mounted for endwise reciprocating motion against the parts at said discharge station for knocking the parts out of the holders and through the ejector gate when open, and an interceptor arm, movable with the gate for intercepting the movement of the punch rod so as not to damage satisfactory parts passed when the ejector gate is closed.

11. A mechanism for inspecting cup-shaped cylindrical parts comprising a horizontally disposed dial having a series of openings uniformly spaced about its circumference, the thickness of the dial being less than the axial dimension of the cylindrical parts undergoing testing, means for rotating the dial through equal steps having a length equal to the spacings of the dial, loading means at a loading station including means for moving the cup-shaped parts beneath the openings as it is rotated to said station and means for elevating the cup-shaped part vertically into the dial openings into a position to expose the top edge of the cylindrical parts for inspection, inspection station means including a light source focused for projecting a beam of light on the exposed edge of the cylindrical parts and discharge gate means at a subsequent station responsive to the inspection station means and vertically oscillating rod means positioned above cylindrical cups at the discharge gate and movable into and out of engagement with the parts for forcibly ejecting defective parts at said discharge gate.

12. A mechanism for inspecting manufactured parts for length and uniformity of chamfer comprising a carrier having part holders thereon, means for feeding said parts one at a time to said part holders, means for moving the part carrier to successive inspection stations, a first photo-electric means for one station for inspecting an edge of the parts for proper length and presence of chamfer, discharge means responsive to said first photo-electric means for discharging parts of improper length or not having a chamfer, a second photo-electric means at a subsequent station for inspecting the same edge of the parts for uniformity of chamfer and presence of nicks, bends or the like in said chamfered edge, and means responsive to said second photo-electric means for ejecting parts found to be defective in not having a uniform chamfer or in having nicks, bends or the like in said chamfered edge.

13. A mechanism for inspecting a part comprising a plate having a series of uniformly spaced openings therein, means for inserting a part in each opening, means for intermittently advancing the plate to successive positions, a series of discharge controllers mounted for movement with the plate, there being a discharge controller corresponding to each of said openings, said discharge controllers being movable to discharging and non-discharging positions, a table beneath said plate having a discharge passage, a gate for covering said passage normally preventing the dischrge of parts when the passage is closed by said gate, but uncovering said passage to permit the discharge of a defective part through the passage, means operably connected to said gate and engageable by discharge controllers when the latter are in the discharging position, means at one station operable in timed relation to the intermittent advancing movement of the plate to pre-set each of said discharge controllers to discharging position as the controllers arrive at such station, means for inspecting the parts, inspection responsive means for retracting the pre-set discharge controller from discharging position to undischarging position for all satisfactory parts, said means being unresponsive when the inspecting means acts upon an unsatisfactory part whereby only unsatisfactory parts are discharged, and means for thereafter retracting all discharge controllers not retracted by the inspection responsive means.

14. An apparatus for inspecting hollow cylindrical manufactured parts of thin sheet metal having an inwardly rolled beading intermediate the ends thereof to determine uniformity and continuity of such beading comprising a carrier having holes therein for receiving and supporting the thin sheet metal parts, means for rotating the parts about their cylindrical axes when so supported in the carrier, a light source and light focusing means for projecting a narrow beam of light into one end of the cylinder and at an angle against the beading exposed within the cylindrical part, photo-cell means positioned to intercept light reflected from a normal beading, amplifier means responsive to the photo-cell output and means responsive to variations in amplified photo-cell output for discharging parts irregularly reflecting light during rotation of the part.

15. An appaartus for inspecting cylindrical parts having a chamfered edge to separate parts of improper length, those lacking chamfer and those having non-uniform, nicked or bent chamfered edge, comprising a carrier, means for mounting the parts on the carrier for complete rotation of the parts about their cylindrical axes during inspection, a first inspection station comprising a focused light source for projecting a light beam on the chamfered edge of the part as it is completely rotated during inspection, means including a photo-cell positioned to intercept reflected light for passing the part when light is reflected from the edge of the part to the cell at any instant during complete rotation of the part while being inspected as occurs when the part is of proper length and has a chamfer or an edge simulating chamfer, a second inspection station including a focused light source for projecting a beam of light on the chamfered edge of the part, a photo-cell positioned to intercept light reflected from a properly chamfered edge, and means responsive to variations in the light normally reflected from the chamfered edge as the part is completely rotated during inspection as occurs with irregular chamfer or bent or nicked chamfered edge, for discharging said parts.

16. An apparatus for inspecting cylindrical parts having a chamfered edge, to separate parts of improper length, those lacking chamfer and those having non-uniform, nicked or bent chamfered edge, comprising a carrier, means for mounting the parts on the carrier for complete rotation of the parts about their cylindrical axes during each of a plurality of inspections, discharge control means on the carrier, one for each part being inspected, said discharge control means being movable to discharging and non-discharging positions, means for pre-setting each discharge controller to discharging conditions upon arrival at a first station, inspection means at said first station for focusing a beam of light on the edge of the part as it is rotated during inspection and photo-cell means for retracting the discharge controller corresponding to the part at said station when light is reflected to the photo-cell at any time during rotation, a first discharge gate means for discharging parts, the discharge controllers of which are retracted at the first station, means for retracting all discharge controllers adjacent the first discharge gate, a second inspection station including means for focusing a beam of light on the chamfered edge of parts reaching said station, photo-cell means positioned in the path of light reflected from a properly chamfered part edge, means responsive to variations in light reflected from the chamfered edge during rotation for moving the discharge controller corresponding to a part at the second inspection station to discharging position when the light reflected from the chamfered edge varies, and second discharge gate means responsive to discharge controllers so moved.

HARRY WILLIAM HOFFMAN.